United States Patent
Banerjee et al.

(10) Patent No.: US 7,498,054 B2
(45) Date of Patent: *Mar. 3, 2009

(54) METHOD FOR CONTROLLING SOLUTE LOADING OF POLYMER MICROPARTICLES

(75) Inventors: Sukanta Banerjee, North Brunswick, NJ (US); Cecilia Georgescu, Piscataway, NJ (US); Michael Seul, Fanwood, NJ (US)

(73) Assignee: BioArray Solutions, Ltd., Warren, NJ (US)

( * ) Notice: Subject to any disclaimer, the term of this patent is extended or adjusted under 35 U.S.C. 154(b) by 582 days.

This patent is subject to a terminal disclaimer.

(21) Appl. No.: 11/179,135

(22) Filed: Jul. 12, 2005

(65) Prior Publication Data

US 2005/0246844 A1  Nov. 10, 2005

Related U.S. Application Data

(62) Division of application No. 10/348,165, filed on Jan. 21, 2003, now Pat. No. 7,255,895.

(51) Int. Cl.
*B05D 7/00* (2006.01)
*C09D 11/00* (2006.01)

(52) U.S. Cl. .................... 427/212; 427/222; 106/31.13; 106/31.27

(58) Field of Classification Search ............... 427/212, 427/222; 106/31.13, 31.27

See application file for complete search history.

(56) References Cited

U.S. PATENT DOCUMENTS

| | | | |
|---|---|---|---|
| 3,790,492 A | 2/1974 | Fulwyler | 252/635 |
| 4,199,363 A | 4/1980 | Chen | 430/512 |
| 4,267,235 A | 5/1981 | Rembaum et al. | 428/407 |

(Continued)

FOREIGN PATENT DOCUMENTS

WO  WO 98/53093  11/1998

(Continued)

OTHER PUBLICATIONS

Okubo et al., *Colloid Polym. Sci.* (1991) 269:222-226.

(Continued)

*Primary Examiner*—Elena T Lightfoot
(74) *Attorney, Agent, or Firm*—Daniel A. Monaco; Drinker Biddle & Reath LLP

(57) ABSTRACT

Solute-loaded polymer microparticles are obtained by immersing microparticles in a bath comprising a selected solute dissolved in a ternary solvent system. A first solvent of the ternary system is a strong solvent for both the solute and the polymer from which the microparticle was formed. A second solvent is a weak solvent or non-solvent for the solute and the polymer (tuning solvent). A third solvent is a weak solvent or non-solvent for the solute and polymer, but serves as a co-solvent with respect to the first and second solvents in that it is miscible with both the first and second solvents. The amount of solute incorporated into the microparticles is controlled by adjusting the ratio of solute with respect to the microparticle polymer, and by adjusting the composition of the ternary solvent system, principally the amount of tuning solvent. The method is particularly useful for providing libraries of combinatorially encoded microparticles containing distinguishable dye loadings, particularly distinguishable fluorescent dye loadings.

21 Claims, 16 Drawing Sheets

U.S. PATENT DOCUMENTS

| | | | |
|---|---|---|---|
| 4,326,008 A | 4/1982 | Rembaum | 428/403 |
| 4,487,855 A | 12/1984 | Shih et al. | 523/201 |
| 4,613,559 A | 9/1986 | Ober et al. | 430/137.17 |
| 4,680,332 A | 7/1987 | Hair et al. | 524/377 |
| 4,717,655 A | 1/1988 | Fulwyler | 435/7.2 |
| 4,774,189 A | 9/1988 | Schwartz | 436/10 |
| 4,829,101 A | 5/1989 | Kraemer et al. | 523/201 |
| 4,996,265 A | 2/1991 | Okubo et al. | 525/242 |
| 5,073,498 A | 12/1991 | Schwartz et al. | 436/8 |
| 5,194,300 A | 3/1993 | Cheung | 427/213.31 |
| 5,244,630 A | 9/1993 | Khalil et al. | |
| 5,266,497 A | 11/1993 | Imai et al. | 436/514 |
| 5,288,577 A | 2/1994 | Yamaguchi et al. | 430/111.2 |
| 5,301,044 A | 4/1994 | Wright | 358/500 |
| 5,326,692 A | 7/1994 | Brinkley et al. | 435/6 |
| 5,395,688 A | 3/1995 | Wang et al. | 428/327 |
| 5,573,909 A | 11/1996 | Singer et al. | 435/6 |
| 5,723,218 A | 3/1998 | Haugland et al. | 428/402 |
| 5,786,219 A | 7/1998 | Zhang et al. | 436/523 |
| 5,952,131 A | 9/1999 | Kumacehev a et al. | 430/21 |
| 6,126,731 A | 10/2000 | Kemeny et al. | 106/31.6 |
| 6,268,222 B1 | 7/2001 | Chandler et al. | 436/523 |
| 6,361,916 B1 | 3/2002 | Chen et al. | 430/137.14 |
| 6,494,924 B1 | 12/2002 | Auweter et al. | 8/456 |
| 6,503,680 B1 | 1/2003 | Chen et al. | 430/137.14 |
| 2002/0032252 A1 | 3/2002 | Ishizuka | 523/160 |
| 2004/0139565 A1 | 7/2004 | Banerjee et al. | 264/4.1 |

FOREIGN PATENT DOCUMENTS

WO     WO 99/19515     4/1999

OTHER PUBLICATIONS

Yamashita et al., *Colloids and Surfaces A.* (1999) 153:153-159.
Battersby et al., *J. Am. Chem. Soc.* (2000) 122:2138-2139.
Grondahl et al., *Langmuir* (2000) 16:9709-9715.
L. B. Bangs, *Uniform Latex Particles*, Seragen Diagnostics Inc., Indianapolis, Indiana (1987), p. 40.

SEQUENCE LISTING

<160> NUMBER OF SEQ ID NOS: 3

<210> SEQ ID NO 1
<211> LENGTH: 27

-continued

```
<212> TYPE: DNA
<213> ORGANISM: Artificial Sequence
<220> FEATURE:
<223> OTHER INFORMATION: Random sequence

<400> SEQUENCE: 1
ccgctcgtct tccaggatgt ccttctg                                    27

<210> SEQ ID NO 2
<211> LENGTH: 18
<212> TYPE: DNA
<213> ORGANISM: Artificial Sequence
<220> FEATURE:
<223> OTHER INFORMATION: complement of SEQ ID NO: 1

<400> SEQUENCE: 2
aaggacatcc tggaagac                                              18

<210> SEQ ID NO 3
<211> LENGTH: 18
<212> TYPE: DNA
<213> ORGANISM: Artificial Sequence
<220> FEATURE:
<223> OTHER INFORMATION: Mismatched with respect to SEQ ID NO:1

<400> SEQUENCE: 3
ataaccagga ggagttcg                                              18
```

METHOD FOR CONTROLLING SOLUTE LOADING OF POLYMER MICROPARTICLES

FIELD OF THE INVENTION

The invention relates to a method for controlling the partitioning of a solute between a liquid continuous phase and a solid dispersed phase, such as in the production of stained particles.

BACKGROUND OF THE INVENTION

Polymer particles containing an entrained solute, e.g., dye, are widely used as markers for biomolecules and as internal reference and calibration standards for assay detection methods such as flow cytometry. Four general methods have been described in the prior art for producing fluorescent polymer particles: (A) copolymerization of dye and monomer; (B) partitioning of water-soluble or oil-soluble dyes into preformed particles; (C) surface functionalization of preformed particles; and (D) encapsulation of dye droplets. In addition, polymerization methods also have been used to prepare core-shell particles, that is, microparticles comprised of a polymer core and a polymer shell.

A. Copolymerization Based Methods

Fluorescent microparticles may be synthesized by polymerization of monomeric units to form microparticles in the presence of fluorescent dyes. U.S. Pat. No. 4,326,008 to Rembaum (1982) describes the synthesis of fluorescent microparticles by copolymerization of functionalized acrylic monomer with a polymerizable fluorescent comonomer. The method generally requires a polymerizable dye molecule. Such methods, generally suffer from the drawback of possible inhibition of polymerization by the fluorescent dye and/or bleaching of the fluorescence by the reactive constituents of the polymerization reaction.

U.S. Pat. No. 4,267,235 to Rembaum (1981) describes the synthesis of polygluteraldehyde microspheres using suspension polymerization. Cosolubilized fluorescein isothiocyanate (FITC) is used to create fluorescent microspheres. Suspension condensation polymerization of the monomer with cosolubilized dye molecules, while largely circumventing dye destruction and polymerization inhibition, generates a broad particle size distribution and hence is not a suitable route for the production of monodisperse fluorescent microspheres.

U.S. Pat. No. 5,073,498 to Schwartz et al. (1991) describes a process for making fluorescent microparticles by seeded polymerization. One or more hydrophobic fluorescent dyes are dissolved in a solution containing monomer and initiator. The solution is added to pre-swollen microparticles. The patent discloses methods permitting the introduction of three different dyes into a particle. The method suffers from the drawback of possible inhibition of polymerization by the fluorescent dye, or conversely the bleaching of the fluorescence by the polymerization process.

Multi-stage emulsion polymerization has been employed to prepare core-shell particles without surface functional groups. U.S. Pat. No. 5,952,131 to Kumaceheva et al. discloses a method for preparing stained core-shell particles. The method is based on multiple stages of semi-continuous polymerization of a mixture of two monomers (methyl methacrylate and ethylene glycol dimethacrylate) and a fluorescent dye (4-amino-7-nitrobnezo-2-oxa-1,3 diazol-labeled methyl methacrylate). The particles are then encapsulated with an outer shell by copolymerization of methyl methacrylate and butylmethacrylate in the presence of chain transfer agent, dodecyl mercaptan. Kumaceheva et al. do not prepare and do not have as an object the inclusion of surface functional group core-shell polymer product.

U.S. Pat. No. 4,613,559 to Ober et al. discloses a method for preparing colored toner by swelling. Polystyrene particles (5.5 micron) are prepared by dispersion polymerization of styrene in the presence of ethanol, poly(acrylic acid), methylcellosolve and benzoyl peroxide. Swelling is performed by dispersing the polystyrene in an aqueous solution of sodium dodecyl sulfate and acetone. Colored particles are obtained by adding an emulsified dye solution (Passaic Oil Red 2144 in methylene chloride emulsified with an aqueous solution of sodium dodecylsulfate) to the particle dispersion.

Polymerization methods have been employed to prepare core-shell particles containing surface functional groups. U.S. Pat. No. 5,395,688 to Wang et al. discloses magnetically-responsive fluorescent polymer particles comprising a polymeric core coated with a layer of polymer containing magnetically-responsive metal oxide. The final polymer shell is synthesized with a functional monomer to facilitate covalent coupling with biological materials. The procedure of Wang et al. is based on three steps: (1) preparation of fluorescent core particles; (2) encapsulation of metal oxide in a polystyrene shell formed over the fluorescent core by free radical polymerization in the absence of emulsifier but with an excess of initiator; and (3) coating of the magnetic fluorescent particles with a layer of functional polymer. The functional polymer has carboxyl, amino, hydroxy or sulfonic groups. Wang et al. do not describe a method for obtaining the colored core and also does not address the problem of destruction of dye during the free radical polymerization process.

U.S. Pat. No. 4,829,101 to Kraemer et al. discloses two-micron fluorescent particles obtained by core-shell polymerization. The core is obtained at 80° C. by polymerizing a mixture of isobutyl methacrylate, methyl methacrylate and ethylene glycol dimethacrylate via ammonium persulfate initiation. A shell is synthesized over the core by semi-continuously adding, in a first step, a mixture of the same monomers containing a fluorescent dye (fluoro-green-gold). Through the end of the reaction, two different monomer mixtures are added over a one hour period: a first mixture containing methyl methacrylate, ethylene glycol-bis-(methacrylate) and glycidyl methacrylate, and a second mixture containing methacrylamide and initiator. The polymerization is initiated with 4,4'-azobis-(cyanovaleric acid).

Okubo et al., *Colloid Polym. Sci.* 269:222-226 (1991), Yamashita, et al., *Colloids and Surfaces A.*, 153:153-159 (1999), and U.S. Pat. No. 4,996,265 describe production of micron-sized monodispersed polymer particles by seeded dispersion polymerization. Polymer seed particles are pre-swelled with large amounts of monomer prior to seeded polymerization. The swelling is carried out by slow, continuous, drop-wise addition of water to an ethanol-water mixture containing the seed particles, monomers, stabilizer and initiator. The addition of water decreases the solubility of the monomer in the continuous phase, leading to precipitation and subsequent absorption of monomer onto or into the seed polymer particles. The monomer absorbed into the seed polymer particle is then polymerized to produce large monodispersed polymer particles.

B. Partitioning of Water-Soluble or Oil-Soluble Dyes

Fluorescent particles can be produced by permitting dye molecules to partition into pre-swollen microparticles according to a technique originally described by L. B. Bangs (*Uniform Latex Particles*; Seragen Diagnostics Inc., 1984, p. 40). The process involves dissolution of a dye molecule or mixture of dye molecules in a solvent or solvent mixture of choice containing polymer microparticles. Absorption of the solvent by the microparticles leads to swelling, permitting the microparticles to absorb a portion of the dye present in the solvent mixture. The staining process is usually terminated by removing the solvent. The level of dye partitioning is controlled by adjusting the dye concentration, and in the case of a plurality of dyes, the relative abundance of individual dyes. Microparticles stained in this manner are quite stable and uniform. However, in many cases, depending on the choice of solvent system, a large dye excess is required to attain the desired partitioning, leading to significant loss of expensive dye material.

U.S. Pat. No. 5,723,218 to Haugland et al. (1998), U.S. Pat. No. 5,786,219 to Zhang et al. (1998), U.S. Pat. No. 5,326,692 to Brinkley et al. (1994) and U.S. Pat. No. 5,573,909 to Singer et al. (1996) describe protocols for producing various fluorescently-colored particles by swelling and dye partitioning in organic solvent and organic solvent mixtures. Various types of fluorescent particles, for example, fluorescent particles containing multiple dyes, particles exhibiting controllable and enhanced Stokes shifts, and particles displaying spherical zones of fluorescence, are described.

International patent application WO 99/19515 of Chandler et al. (1997) describes an improved method for the production of a series of ratiometrically-encoded microspheres with two dyes. A protocol for the production of 64 different encoded microspheres is reported. A swelling bath composition using a mixture of an organic solvent and alcohol (under anhydrous conditions) also is disclosed.

U.S. Pat. No. 5,266,497 to Matsudo et al. (1993) describes a method for generating a dye-labeled polymer particle which uses a hydrophobic dye dissolved in an organic solvent emulsified in water. The dyed particles were used for immunochromatographic purposes.

U.S. Pat. No. 4,613,559 to Ober et al. (1986) describes the synthesis of colored polymer particles using oil-soluble dyes. The disclosed method uses an emulsion of a dichloromethane dye solution in a water and acetone mixture for coloring the particles.

C. Functionalization of Internal or External Microparticle Surfaces

Production of fluorescent particles by surface functionalization involves the covalent attachment of one or more dyes to reactive groups on the surface of a preformed microparticle. This leaves the dye molecules exposed to the environment, which can hasten the decomposition of the dye. In addition, surface functionalization often renders a particle surface very hydrophobic, inviting undesirable non-specific adsorption and, in some cases, loss of activity of biomolecules placed on or near the particle surface. These problems can be circumvented by attaching a stained small particle, in lieu of a dye molecule, to the surface of a carrier particle. The efficacy of this method in generating large sets of encoded particles from a small number of dyes (ratio encoding) is unclear.

U.S. Pat. No. 4,487,855 to Shih (1984), U.S. Pat. No. 5,194,300 to Cheung (1993) and U.S. Pat. No. 4,774,189 to Schwartz (1988) disclose methods for preparation of colored or fluorescent microspheres by covalent attachment of either one or a plurality of dyes to reactive groups on the preformed particle surface. Battersby et al., "Toward Larger Chemical Libraries: Encoding with Fluorescent Colloids in Combinatorial Chemistry" *J. Am. Chem. Soc.* 2000, 122, 2138-2139; Grondahl et al., "Encoding Combinatorial Libraries: A Novel Application of Fluorescent Silica Colloids", *Langmuir* 2000, 16, 9709-9715; and U.S. Pat. No. 6,268,222 to Chandler et al. (2001) describe a method of producing fluorescent microspheres by attaching to the surface of a carrier microparticle a set of smaller polymeric particles that are stained.

D. Encapsulation Methods

Formation of fluorescent particles by encapsulation utilizes a solution of a preformed polymer and one or more dyes. In one approach, the solution is dispensed in the form of a droplet using a vibrating nozzle or jet, and the solvent is removed to produce polymer particles encapsulating the dye. This process requires specialized process equipment and displays only limited throughput. Alternatively, a polymer dye mixture is emulsified in a high-boiling solvent and the solution is evaporated to yield polymer-encapsulated dye particles. This process often generates non-spherical particles with broad size distribution.

U.S. Pat. No. 3,790,492 to Fulwyler et al. (1974) discloses a method to produce uniform fluorescent microspheres from a pre-dissolved polymer and dye solution using a jet. U.S. Pat. No. 4,717,655 to Fulwyler et al. (1988) discloses a process which includes two dyes in pre-designated ratios in a polymer microparticle to produce five distinguishable two-color particles.

The various prior art methods of producing fluorescent microparticles suffer from certain disadvantages. Where strong swelling solvents are used, the microparticles must be cross-linked to prevent them from disintegrating and deforming in the dye solution. This constraint represents a severe limitation since the majority of dyes require for their dissolution at any reasonable concentration solvent systems in which most polymer particles of interest, notably polystyrene particles, also will dissolve. These considerations have restricted the application of solvent swelling in the prior art to chemically stabilized ("cross-linked") microparticles. This restriction introduces additional difficulty and cost in microparticle synthesis; highly cross-linked particles are often very difficult to synthesize. Also, restriction to cross-linked particles limits the degree of microparticle swelling and thus the degree of dye incorporation. Specifically, the application of solvent swelling protocols of the prior art conducted on cross-linked microparticles generally limits penetration of the dye to the outer layer of the microparticle, thereby precluding uniform staining of the entire interior volume of individual particles and generally also precluding the realization of high levels of dye incorporation. What is needed is a process that can utilize non-cross-linked, as well as cross-linked, particles. What is needed is a method that will provide dye-loaded non-cross-linked polymer microparticles, which may be used, for example, to prepare libraries of dyed microparticles having containing different dyes and/or different dye amounts.

The degree of particle swelling in prior art solvent swelling-based methods of dye incorporation determines the rate of dye transport into the particles. Diffusion barriers lead to non-uniform dye distribution in the microparticles. For this reason, intense micro-mixing (brought about by either efficient mechanical mixing or by sonication) is required in order to produce uniformly stained populations of microparticles. These vigorous mixing procedures, while effective for laboratory scale preparation, are not easily adapted to larger scales. For example, sonication often requires specialized equipment such as probe sonicators, and limits the parallel completion of multiple staining reactions. What is needed is a dyed particle manufacturing process that requires less vigorous mixing or no mixing, and permits parallel staining reactions to be performed.

Microparticles stained by prior art swelling methods are vulnerable to subsequent exposure to solvents that may cause substantial loss of dye and may preclude the implementation of protocols providing for multiple sequential dye incorporation steps.

In the prior art methods, the degree of dye partitioning into the polymer matrix is controlled by explicit variation of the initial concentration of dye in the dye solution. This approach, while permitting the realization of multiple, distinct levels of dye inclusion, suffers from a number of disadvantages. For example, high levels of staining frequently are not attainable because of the limited solubility of the dye in the bath. Even when solubility is not an issue, the low partition coefficients of many dyes requires a large excess of dye in solution introducing the risk of deleterious effects on subsequent bioanalytical assays. In fact, when carboxylate-modified beads are prepared by prior art solvent-swelling methods, the carboxyl function may become inoperative, and may be no longer available for functionalization by covalent coupling to other chemical groups. In addition, valuable dye material is lost in significant quantities. What is needed is a process for preparing stained microparticles, and fluorescent microparticles in particular, that achieves dye incorporation even from poorly soluble dye/solvent formulations. What is needed is a process that allows for precise control of the solute (dye) loading level in polymer microparticles during the staining process.

SUMMARY OF THE INVENTION

According to one embodiment, a method for modulating the loading of a solute in polymer microparticles is provided. The method comprises:
(a) providing:
  (i) at least one first solvent in which the solute and the microparticle polymer are soluble;
  (ii) at least one second solvent in which the solute and the microparticle polymer are not or only weakly soluble, said first and second solvents being immiscible or at most partially miscible;
  (iii) at least one third solvent in which the solute and the microparticle polymer are not or only weakly soluble, said third solvent being miscible with the first and second solvents;
(b) forming a suspension of said polymer microparticles in a designated volume of a mixture comprising at least one second solvent and at least one third solvent;
(c) adding to said polymer microparticle suspension a solution comprising a solute dissolved in said first solvent whereby the solute is taken up by the microparticles to provide a suspension of microparticles characterized by a desired concentration of said solute in the microparticles;
(d) changing the concentration of said solute in at least a portion of the microparticles to a selected second solute concentration by adding to the microparticle suspension or fraction thereof a selected amount of the solute, a selected amount of at least one second solvent, or combination of solute and second solvent, whereby less than complete partitioning of the solute from the suspension liquid phase to the microparticles takes place.

According to one embodiment, the selected second solute concentration is achieved by adding to the suspension of microparticles characterized by the first solute loading concentration a selected amount of at least one second solvent. According to another embodiment, a plurality of microparticle fractions of selected solute concentrations are provided by dividing the suspension of microparticles characterized by the first solute concentration into fractions, and adding selected amounts of a second solvent to the fractions.

According to another embodiment of the invention, a method for modulating the solute loading of polymer microparticles comprises:
(a) providing:
  (i) at least one first solvent in which the solute and the microparticle polymer are soluble;
  (ii) at least one second solvent in which the solute and the microparticle polymer are not or only weakly soluble, said first and second solvents being immiscible or at most partially miscible;
  (iii) providing at least one third solvent in which the solute and the microparticle polymer are not or only weakly soluble, said third solvent being miscible with the first and second solvents;
(b) forming a suspension of said polymer microparticles in a designated volume of a mixture comprising at least one second solvent and at least one third solvent;
(c) adding to said polymer microparticle suspension a solution of solute dissolved in said first solvent whereby the solute is taken up by the microparticles to provide a suspension of microparticles characterized by a desired first concentration of the solute;
(d) continuously or semi-continuously adding second solvent to the microparticle suspension to continuously or semi-continuously modulate the microparticle solute concentration;
(e) removing at least one portion of said microparticles from the suspension at a time interval during the course of said second solvent addition to provide at least two microparticle sets which differ in solute concentration.

In another embodiment, the invention is a method for modulating the dye loading of polymer microparticles comprising:
(a) providing microparticles characterized by a first concentration of at least one dye contained in said microparticles, said microparticles suspended in a dye solution comprising the at least one dye and a solvent system comprising:
  (i) at least one first solvent in which the dye and the microparticle polymer are soluble;
  (ii) at least one second solvent in which the dye and the polymer are not or only weakly soluble, said first and second solvents being immiscible or at most partially miscible;
  (iii) at least one third solvent in which the dye and the polymer are not or only weakly soluble, said third solvent being miscible with the first and second solvents;
(b) adding to said microparticle suspension a selected amount of the second solvent to change the amount of the dye partitioning to the polymer microparticles and the concentration of dye in said microparticles; and
(c) incubating the microparticle suspension for a period of time so that the amount of dye partitioning to the microparticles, for a given initial dye concentration in the dye solution, is determined by the amount of second solvent added to the microparticle suspension.

In yet another embodiment, the invention is a method of producing dyed polymer microparticles comprising:
(a) providing:
  (i) at least one first solvent in which the dye and the microparticle polymer are soluble;
  (ii) at least one second solvent in which the dye and the microparticle polymer are not or only weakly soluble, said first and second solvents being immiscible or at most partially miscible;

(iii) at least one third solvent in which the dye and the microparticle polymer are not or only weakly soluble, said third solvent being miscible with the first and second solvents;

(b) forming a suspension of said polymer microparticles in a designated volume of a mixture comprising at least one second solvent and at least one third solvent;

(c) adding to said polymer microparticle suspension a solution comprising the dye dissolved in said first solvent whereby the dye is taken up by the microparticles to provide a master-batch suspension of microparticles characterized by a first concentration of said dye in the microparticles;

(d) creating two or more aliquots from said microparticle master-batch suspension containing selected added amounts of second solvent to change the amount of dye partitioning to the polymer microparticles in said aliquots; and (e) incubating the microparticle suspension aliquots for a period of time so that the amount of dye partitioning to the microparticles, for a given initial dye concentration in the dye solution, is determined by the amount of second solvent added to the microparticle suspension aliquots.

An automated method for producing dyed polymer microparticles is also provided. The method comprises:

(a) providing a microparticle master-batch suspension comprising microparticles characterized by a first dye state, said microparticles suspended in a dye solution comprising at least one dye and a solvent system comprising:
  (i) at least one first solvent in which the dye and the microparticle polymer are soluble;
  (ii) at least one second solvent in which the dye and the polymer are not or only weakly soluble, said first and second solvents being immiscible or at most partially miscible;
  (iii) at least one third solvent in which the dye and the polymer are not or only weakly soluble, said third solvent being miscible with the first and second solvents;

(b) creating two or more microparticle suspension aliquots from said master-batch suspension, each such suspension aliquot characterized by microparticles of said first dye state suspended in said dye solution;

(c) executing, at least once for each created aliquot, the following sequence of steps to transform the microparticle dye state in each aliquot from said first dye state to a selected second dye state:
  (i) computing, for the selected second dye state:
    (1) the amount of dye dissolved in said first solvent, and
    (2) the amount of second solvent, required to be added to said aliquot to attain said selected second microparticle dye state; and
  (ii) dispensing to said aliquot the amount of dye dissolved in said first solvent and the amount of second solvent required to attain said selected second microparticle dye state.

An apparatus for producing dyed polymer microparticles comprises a computer operatively connected to a pipetting robot, wherein the computer is programmed to carry out the aforesaid automated method The step of creating said two or more microparticle suspension aliquots containing selected added amounts of second solvent may comprise dividing the microparticle suspension master-batch into two or more aliquots, and adding selected amounts of second solvent to said aliquots. Alternatively, the step of creating the two or more microparticle suspension aliquots containing selected added amounts of second solvent may comprise continuously or semi-continuously adding second solvent to the microparticle suspension master-batch and removing at least one portion of the master-batch at a time interval during the course of the second solvent addition. The result is the formation of two or more microparticle suspension aliquots containing selected added amounts of second solvent.

Figure 6A:
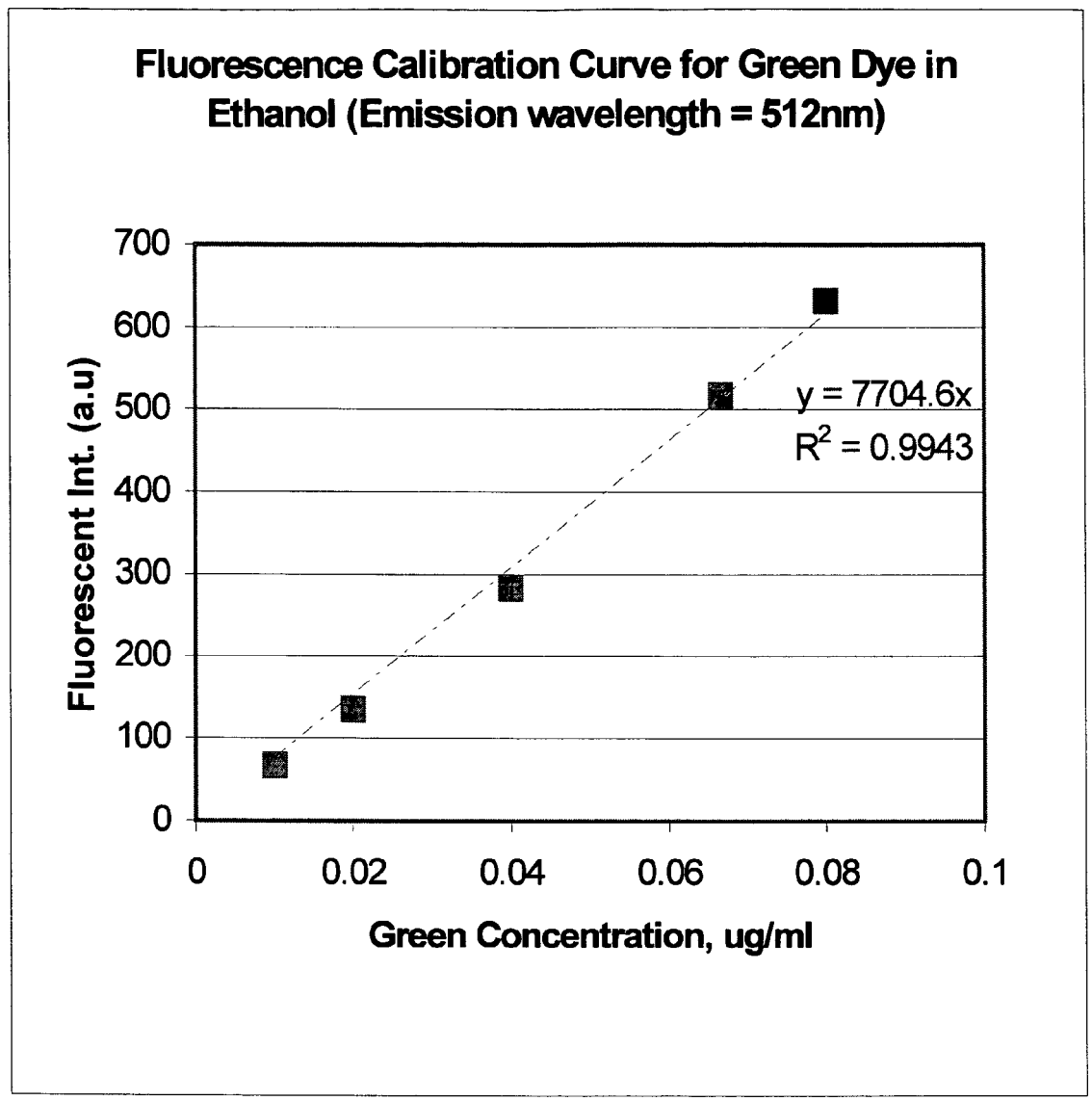
FIG. 6(a) is a fluorescence calibration curve plotting the intensity of fluorescence at emission wavelength 512 nm versus dye concentration for the green fluorescent dye 4,4- difluoro-5,7-dimethyl-4-bora-3a,4a-diaza-s-indacene-3-pentanoic acid, succinimidyl ester, dissolved in ethanol.
Figure 6B:
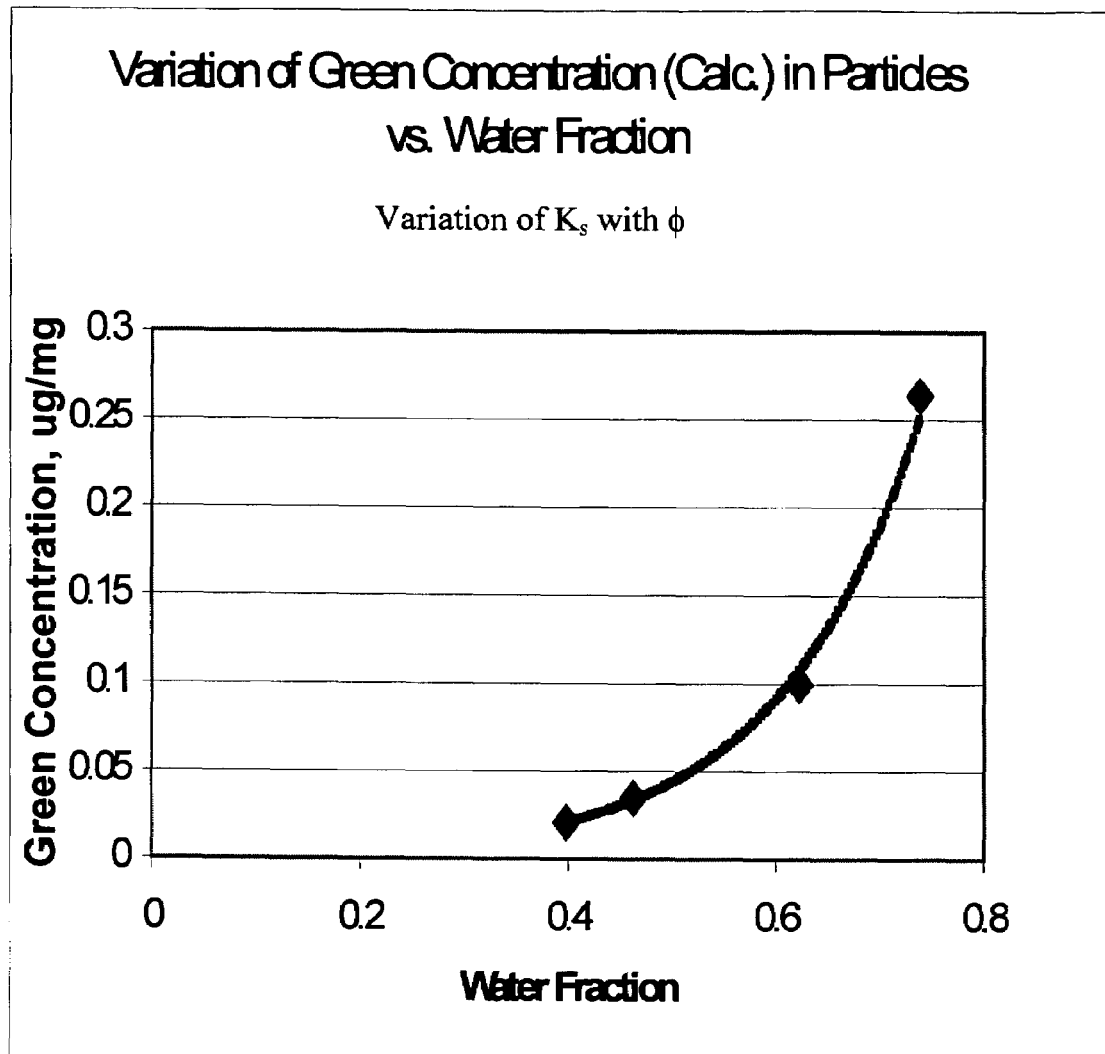

FIG. 6(b) is a plot of the variation of the calculated amount of green fluorescent dye entrapped in particles as a function of the water volume fraction utilized in preparing the particles of Examples 3-6.

Figure 6C:
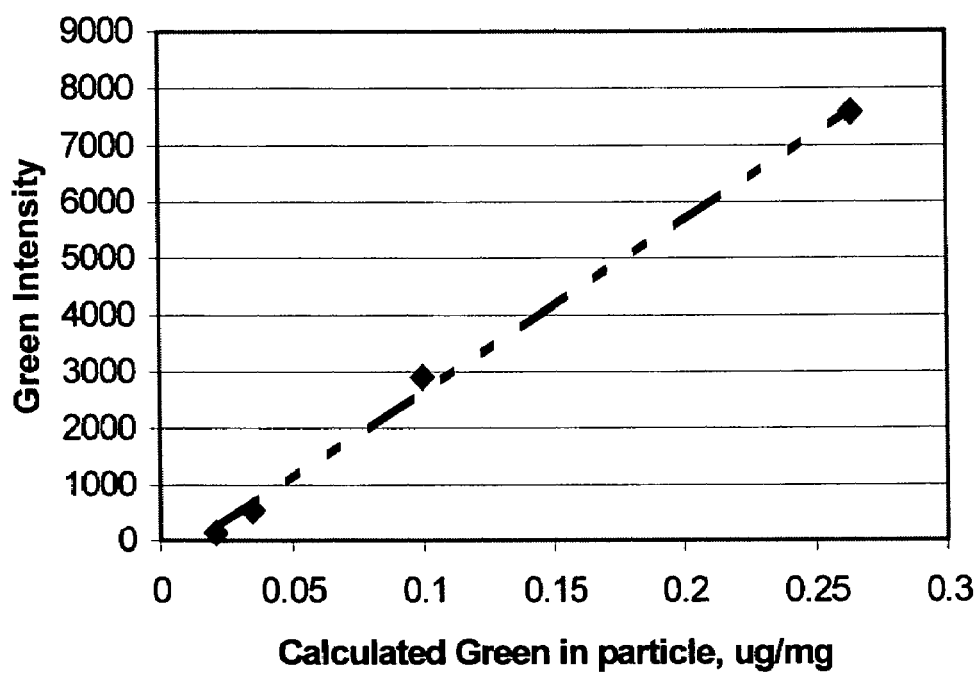

FIG. 6(c) is a plot of the variation of the calculated amount of green fluorescent dye entrapped in particles as a function of the green fluorescent dye intensity for the particles of Examples 3-6.

Figure 6D:
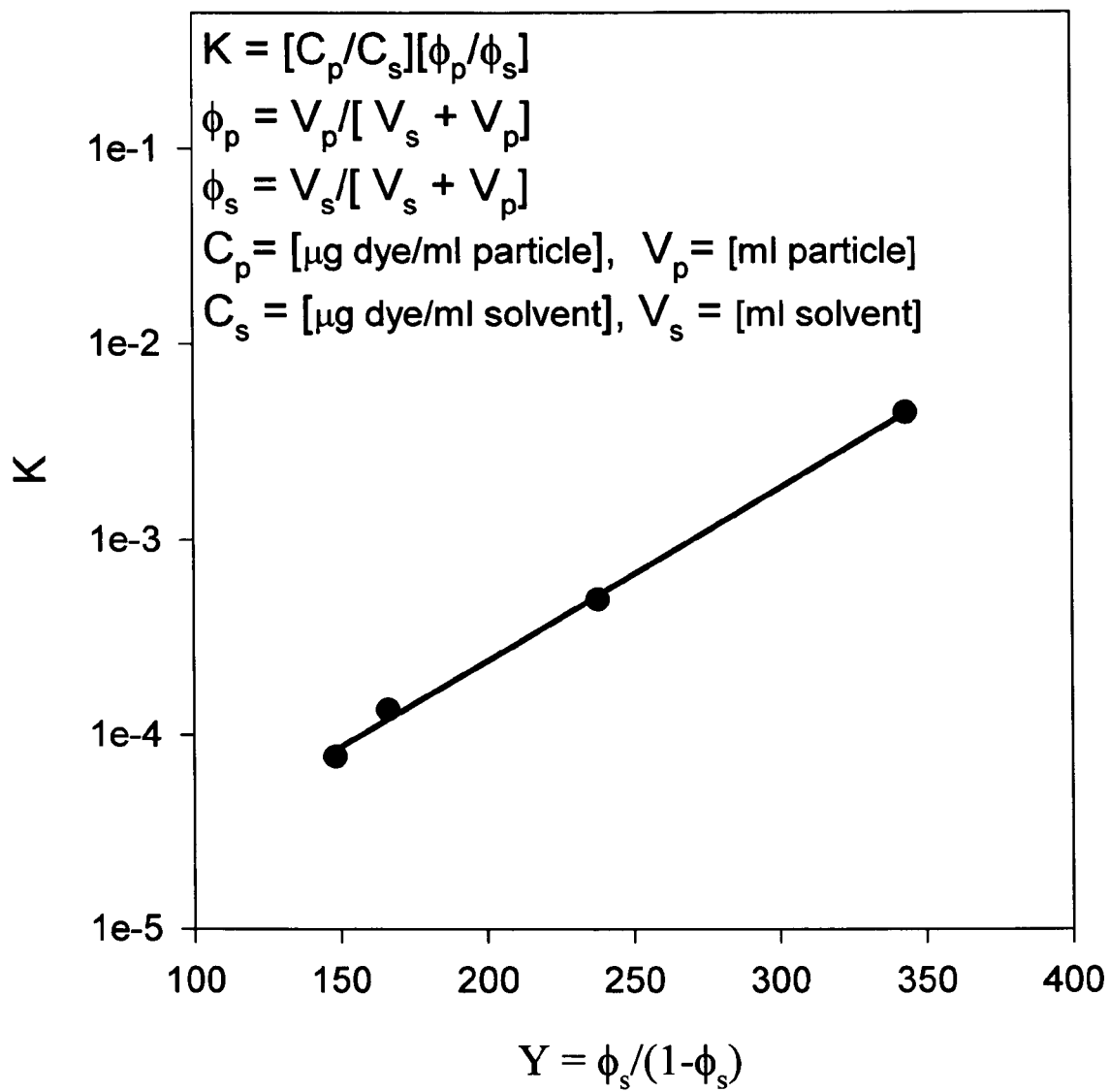

FIG. 6(d) is plot of the variation of the partition coefficient of the green fluorescent dye as a function of Y (where, $Y=(1-\phi_s)/\phi_s$).

Figure 7:
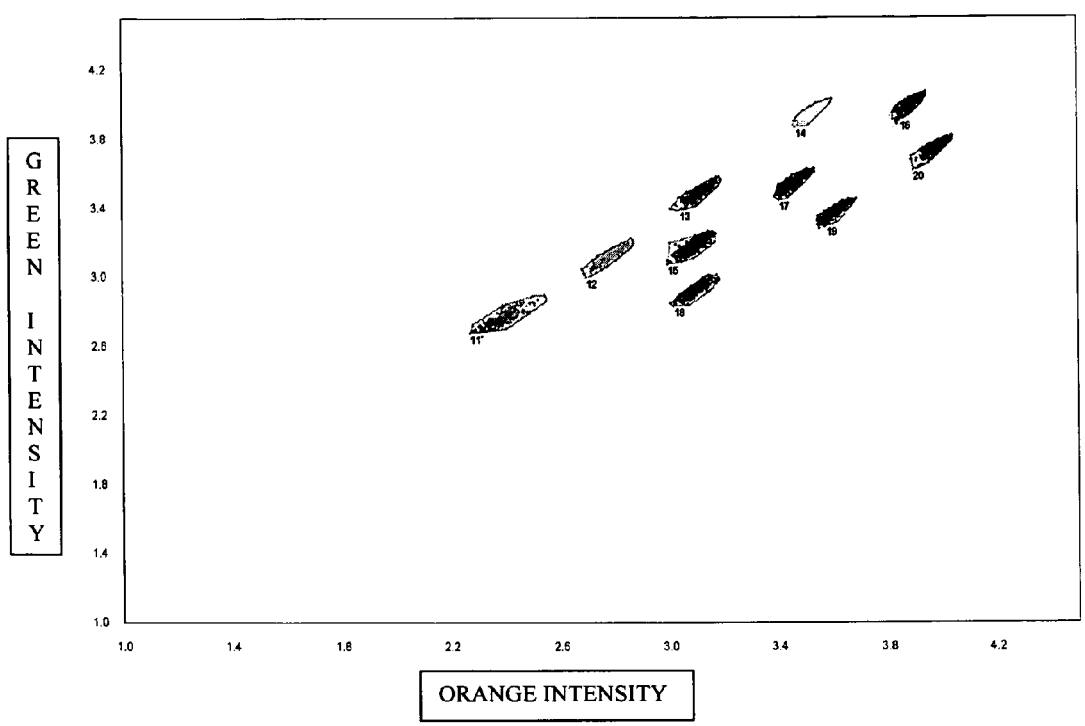

FIG. 7 is a plot of the fluorescence of the collection of particles prepared according to Example 26.

Figure 8:
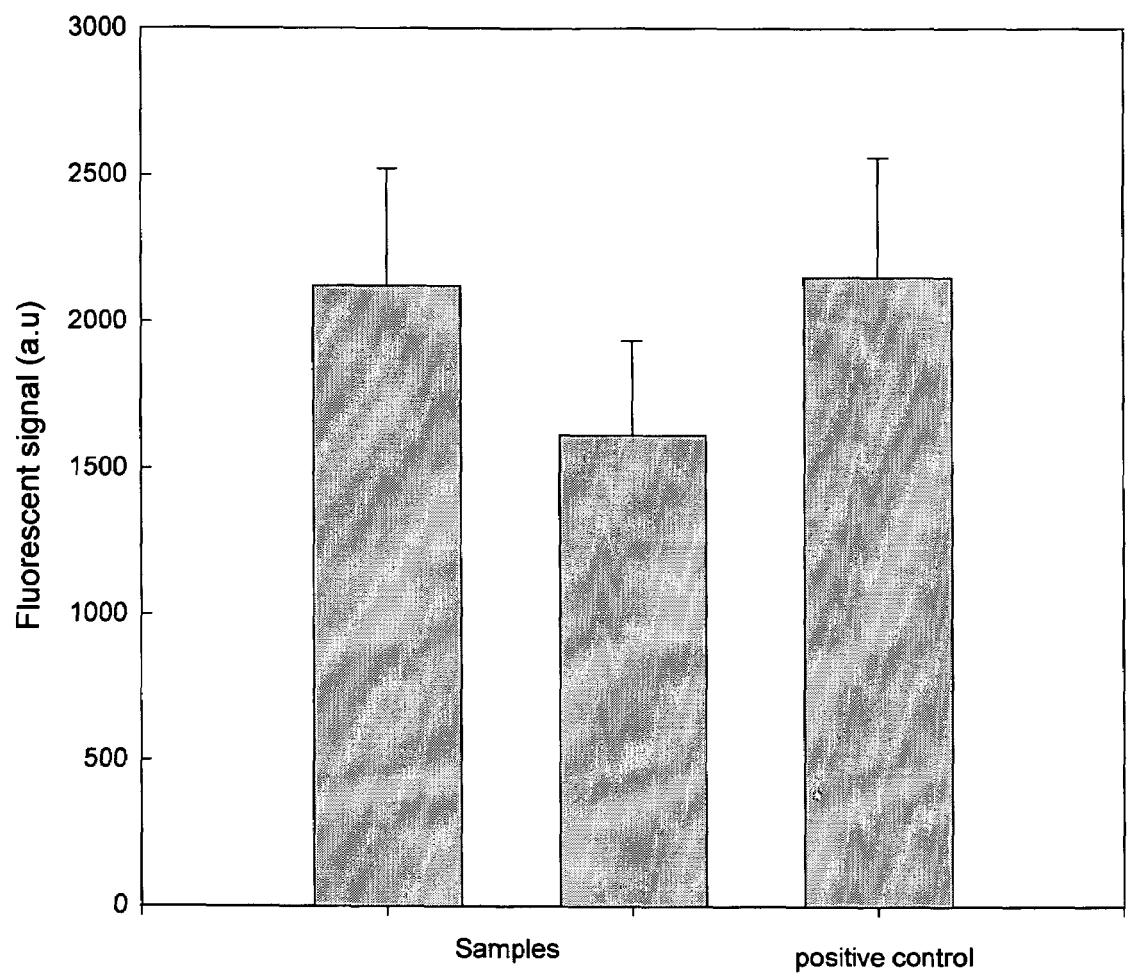

FIG. 8 is a plot of the fluorescence emitted by the particles produced according to Example 30.

Figure 9:
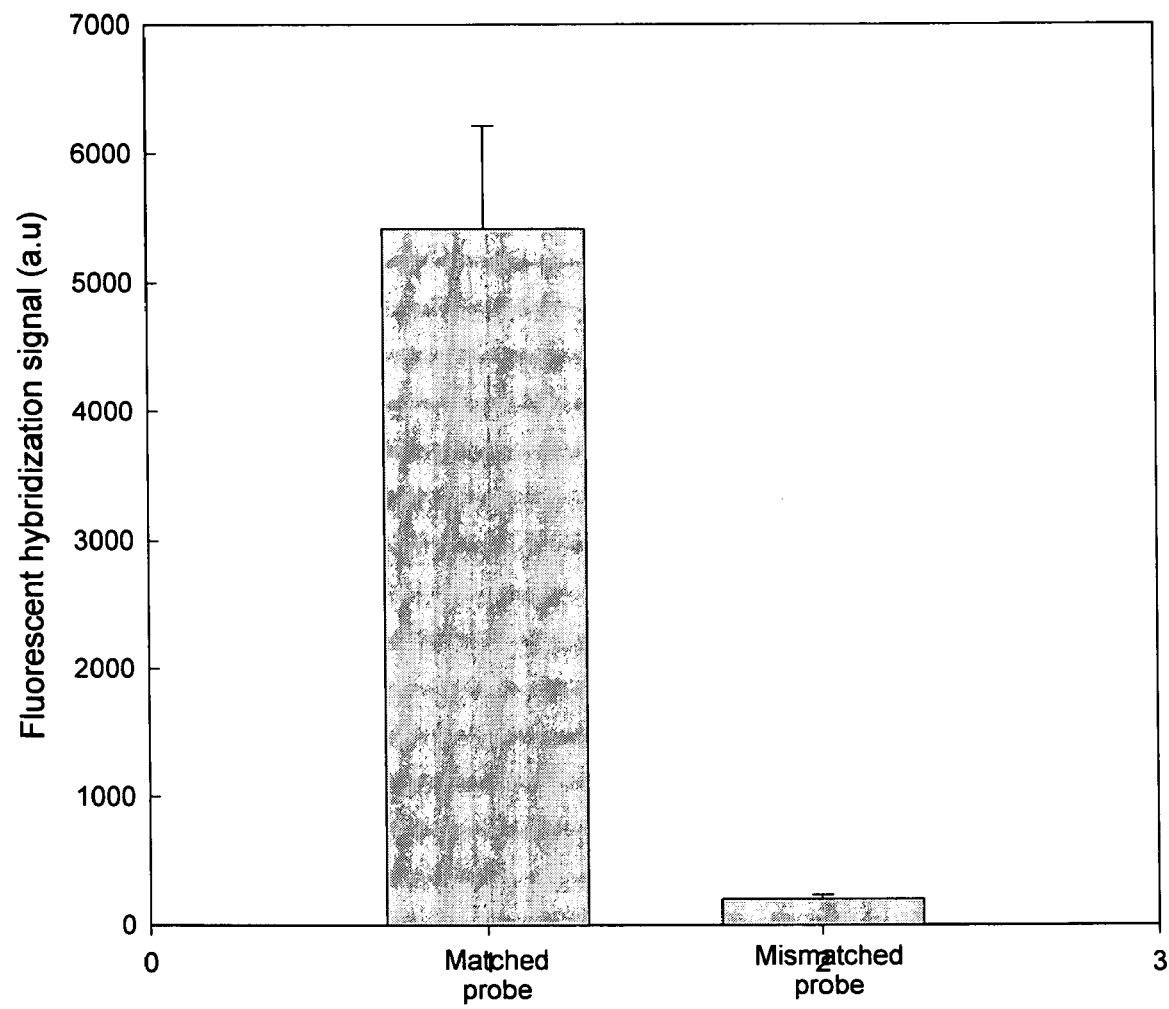

FIG. 9 is a plot of the fluorescence emitted by the particles produced according to Example 31.

DETAILED DESCRIPTION OF THE INVENTION

The distribution of a solute between two immiscible phases designated 1 and 2 is governed by the partition coefficient, K, which represents the ratio of the equilibrium amounts of solute (N) in the two phases, that is, $K=[N_1/N_2]$.

The present invention provides methods to tune the partition coefficient, K, governing the distribution of a solute between two substantially immiscible phases, that is, distribution between a liquid continuous phase and a dispersed solid phase comprising solid particles dispersed in the liquid continuous phase. Thus, the invention provides for the controlled introduction of solutes into polymer microparticles in solvent systems. The solute may comprise any material which may be partitioned to the polymer microparticle phase, such as dyes, pigments, drugs, catalysts, nanoparticles, or any other useful material for which loading onto or into a polymer microparticle is desired.

In a preferred embodiment, the solute is a dye, and the invention is illustrated hereinafter by the partition of dye (solute), between two substantially immiscible phases, namely a population of preformed polymer microparticle (phase 1) and a homogeneous ternary solvent mixture (phase 2). The microparticles comprise a solid phase. The solvent mixture comprises a liquid phase. The dye may be any substance capable of imparting a desired color or desired fluorescence to a polymer microparticle. Thus, the dye may comprise a chromophore or a fluorophore. The amount of dye incorporated in the microparticles is precisely controlled by tuning, for given initial dye concentration, the composition of the ternary solvent mixture. As illustrated below, the method is capable of producing populations of distinguishable dye-stained microparticles containing reproducible pre-determined levels of dye, i.e. "dye encoding", with minimal intra-sample variation of dye content.

The method of the present invention thus introduces solvent composition as a novel control parameter for the preparation of stained microparticles by providing for the quantitative adjustment, over a wide range, of the partition coefficient governing the distribution of dye between dye bath and microparticles. Specifically, the partition coefficient, K, of the dye under solvent tuning obeys the following relation: $K=a \exp(bY)$, where $Y=(1-\phi_S)/\phi_S$; $\phi_S$ denotes the volume fraction of the solvent; and (a) and (b) are constants.

Dye encoding according to the present invention results from varying the dye loading of the particles. By "loading" with respect to the dye contained in a microparticle is meant the amount and/or character of the dye incorporated into the microparticle. The loading can thus vary by at least one property selected from the (i) amount of incorporated dye and (ii) the identity of incorporated dye. Encoding may thus take the form of varying the amount of a single dye as between different sets of microparticle, varying the chemical nature of the dye (using different dyes, or different combinations of dyes), or both.

Figure 1A:
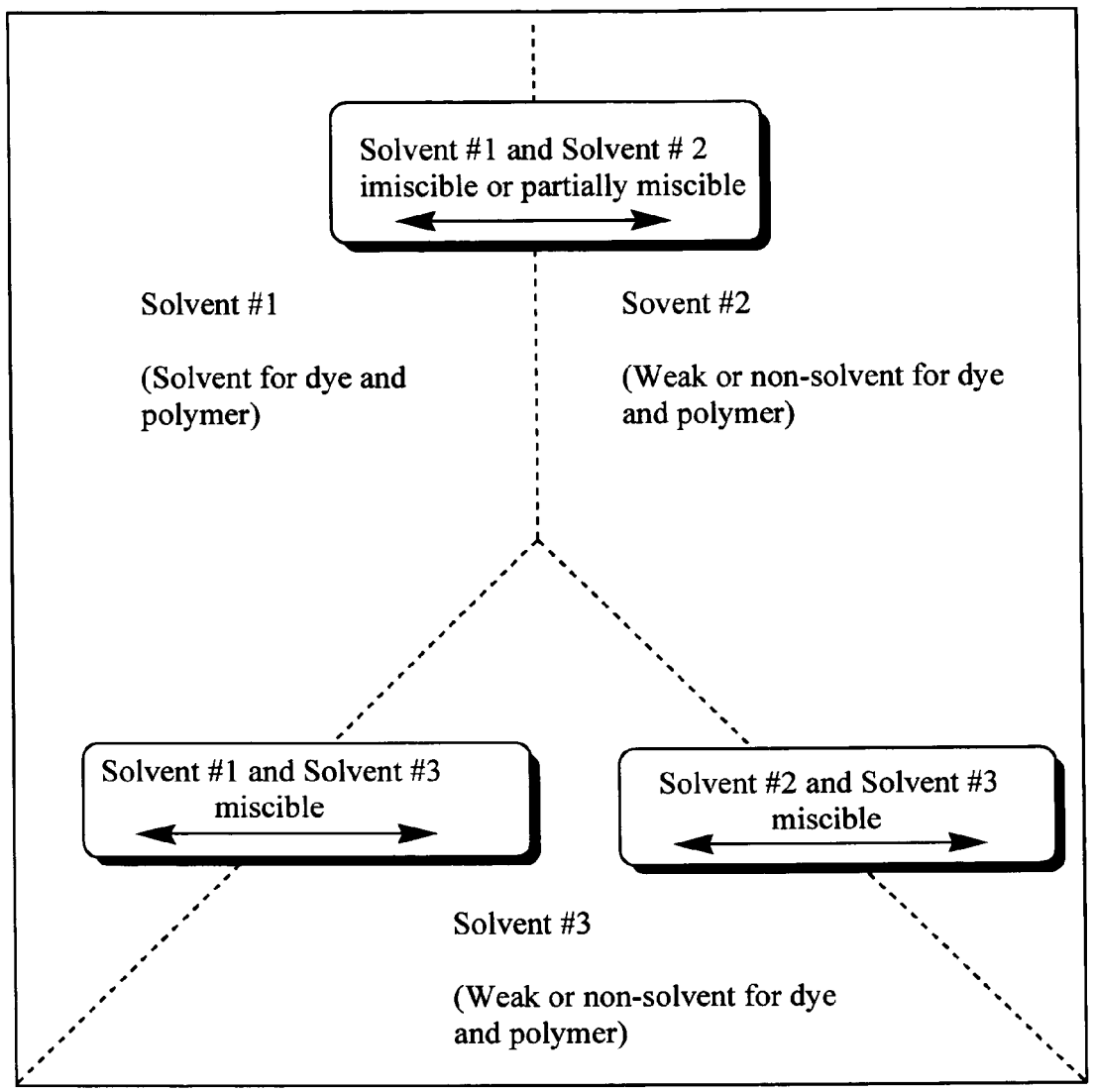
FIG. 1(a) is a schematic representation of a ternary solvent solution for use in the present invention.

A homogenous ternary solvent mixture according to the present invention for the preparation of dyed microparticles, particularly fluorescently dyed microparticles, is schematically illustrated in FIG. 1(a). Solvent #1 is a strong solvent for both the dye and the polymer from which the microparticle is formed. Solvent #2, also referred to herein as the "tuning solvent", is a weak solvent or non-solvent for the dye and the polymer. In a preferred embodiment, Solvent #2 is an aqueous solvent, preferably water. Solvents #1 and #2 are either immiscible or partially miscible with respect to each other. A third solvent, Solvent #3, is a weak solvent or non-solvent for the dye and polymer, but serves as a co-solvent with respect to Solvents #1 and #2 in that it is miscible with both Solvents #1 and #2. In a preferred embodiment, Solvent #3 is an alcohol.

The prior art "swelling" methods of microparticle dye incorporation are limited by the narrow range of choices of available solvents for dyes of interest, generally requiring the use of cross-linked particles. These prior art methods involve identifying a solvent of choice in which the dye is soluble over a range of concentrations, and preparing a dye solution of desired concentration. Then, the dye solution is contacted with the polymer microparticles for a period of time so as to permit the dye to penetrate into in the microparticles.

Prior art swelling methods of fluorescent particle production suffer from limited dye solubility in the dye bath. Even when dye solubility is not an issue, the low partition coefficient of many dyes for the polymer requires a large excess of valuable fluorescent dye, which is lost. In contrast, the present invention produces microparticles of very high dye content, even from poorly soluble dye/solvent formulations. This aspect of the invention reflects the fact that the dye in the bath may be completely depleted by solvent tuning.

In contrast to prior art solvent swelling based methods, the dye incorporation method of the present invention may be used with equal efficacy for the dyeing of non-cross-linked as well as cross-linked particles. By "cross-linked" as describing a polymer comprising a microparticle is meant a polymer in which chains are joined together to form a three-dimensional network structure. Cross-linking can be carried out during the polymerization process by use of a cross-linking agent, that is, an agent which has two or more groups capable of reacting with functional groups on the polymer chain. Cross-linked polymers may also be prepared by the polymerization of monomers with an average functionality greater than two.

The invention thus provides, for the first time, dye-loaded microparticles that are composed of a non-cross-linked polymer. This is a significant improvement because highly cross-linked particles are often very difficult to synthesize. Furthermore, unlike many prior art particle-dyeing methods that rely on intense mixing to achieve uniformity in dye staining of the microparticles, the present method requires only mild agitation. The mild agitation is required merely to keep the particles suspended. This is a significant improvement over prior art methods because the intense mixing of those methods requires specialized equipment and is difficult to scale up.

Polymer cross-linking generally restrains swelling of microparticles formed from cross-linked polymers, and also prevents penetration of the dye into the particle. As a result, the dye is restricted to a thin outer layer of the microparticle, and limits the dye loading. The ability to utilize non-cross-linked polymers as the microparticle material allows, for the first time, the production of dyed polymer microparticles that are characterized by a substantially uniform dye distribution throughout the volume of the microparticle. By "substantially uniform" is meant that the stained particle produces a symmetric and unimodal fluorescent intensity profile under conditions of fluorescent imaging. In contrast, a surface-stained particle (where the fluorescent agent is confined to the surface, or to a shallow region close to the surface) produces a symmetric but bimodal fluorescent intensity profile.

In some circumstances, it may be desirable to obtain a controlled non-uniform dye distribution in the microparticle. Less than complete dye penetration can be achieved by removing the microparticle from the staining bath before the microparticle phase dye has reached equilibrium with the liquid phase dye. The extent of dye penetration is determined by the microparticles' incubation time in the staining bath. Removal of the particles from the bath prior to equilibration results in a symmetric but bimodal fluorescent intensity profile. The shape of the particle fluorescence intensity profile, in particular the location of intensity peaks, is a function of the pre-equilibration incubation time. Thus, microparticle incubation time in the staining bath provides a further dimension for microparticle encoding. Microparticle sets of varied fluorescence intensity profiles may be produced, using the same dye but by varying the microparticle incubation times in the staining bath. Multiple dyes may be utilized to provide even greater encoding.

According to the present invention, the amount of dye incorporated into the microparticles is controlled by adjusting the ratio of dye with respect to polymer, and by adjusting the composition of the dye bath. In particular, and in contrast to prior art methods, the volume fraction of one constituent of the ternary solvent system, namely the tuning solvent, is conveniently varied so as to control the partitioning of the dye between the solvent and the polymer comprising the microparticles. Unlike prior art methods, the invention provides considerably greater flexibility in dye selection and solvent system formulation. Considerably greater control of dye partitioning is achieved using a multi-constituent solvent system. As elaborated below, the method of the invention takes advantage of an exponential dependence of the partition coefficient K on solvent composition and thereby attains greater control of dye incorporation than is achievable by the prior art "swelling" methods. Rather than tuning the partition coefficient, prior art methods simply vary the initial dye concentration in the bath, and thereby achieve a proportional variation in the dye content of the microparticle (the proportionality constant being the partition coefficient K).

Figure 2:
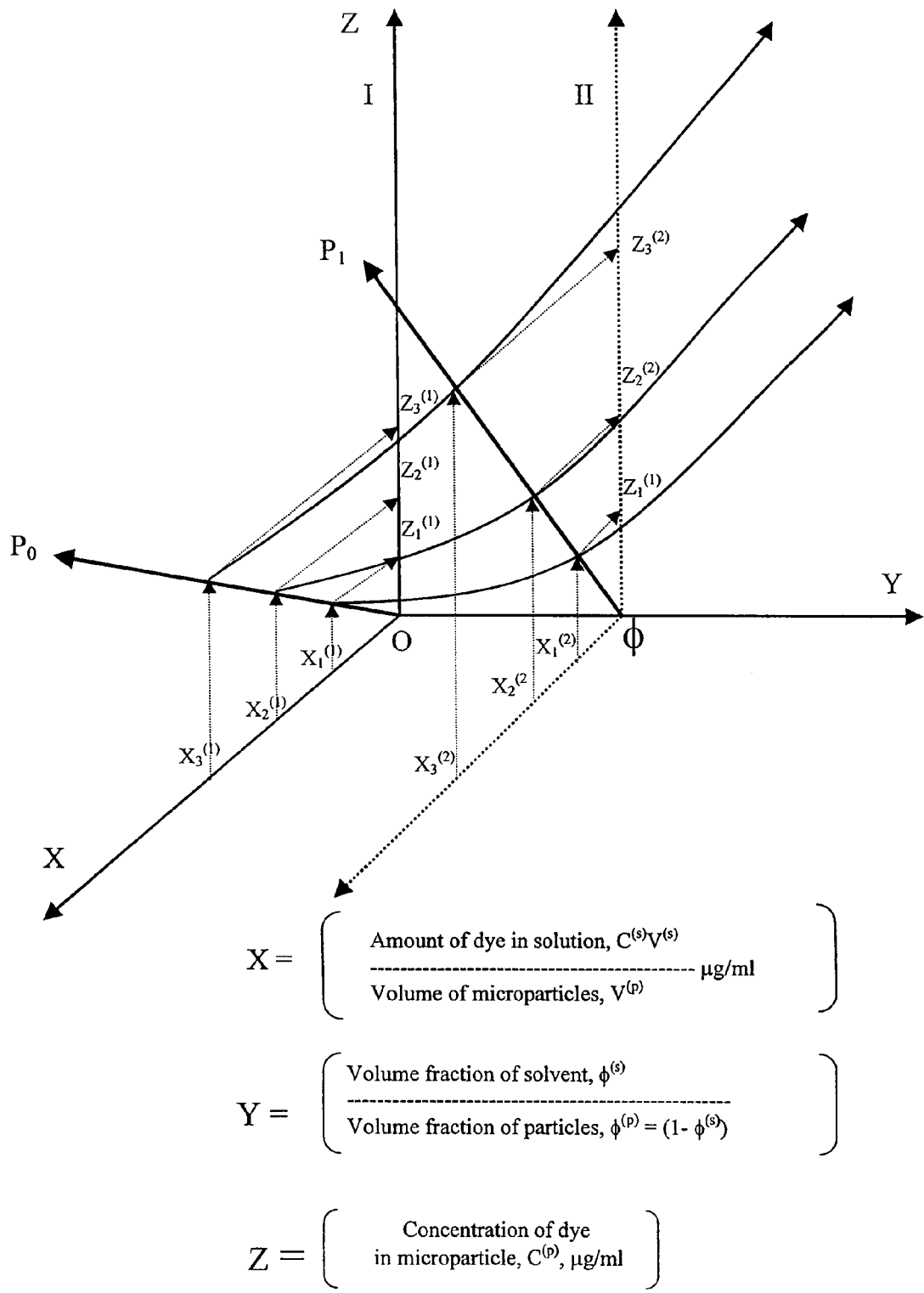
FIG. 2 is a three-dimensional plot of the level of dye incorporation into polymer microparticles in a solvent bath according to the present invention as a function of three variables. (X) is the mass of dye in the bath (represented as the concentration of the dye, $C^{(s)}$, multiplied by the volume of the dye added to the bath, $V^{(s)}$) divided by the volume of the microparticles, $V^{(p)}$. (Y) is the volume fraction of the microparticles in the bath, $\phi^{(p)}$, divided by the volume fraction of solvent, $\phi^{(s)}$. (Z) is the concentration of dye contained in the microparticles, $C^{(p)}$. Thus, the (Z) axis represents the mass of dye partitioned into the microparticle divided by the microparticle volume. The volume fraction of the particles, $\phi^{(p)}$, is given by the equation $\phi^{(p)}=(1-\phi^{(s)})$. Line ($P_0$) in plane (X,Z) represents dye partitioning as a function of X into microparticles in the absence of tuning solvent. Line ($P_1$) represents dye partitioning into microparticles as a function of the mass of dye in the bath (X) in the presence of a volume fraction, $\phi$, of tuning solvent.

FIG. 2 contrasts the solvent tuning method of the present invention in the context of varying dye partitioning into polymer microparticles with the swelling method of the prior art. Points $X_1^{(1)}$, $X_2^{(1)}$ and $X_3^{(1)}$, each represent the mass of dye in the solvent system divided by the volume of the microparticles contained in the system. Points $Z_1^{(1)}$, $Z_2^{(1)}$ and $Z_3^{(1)}$ each represent the corresponding concentration of dye incorporated into microparticles The level of dye incorporation into the microparticles is linearly related (line $P_0$) to the mass of dye in the solvent system, the slope of the line being a function of the partition coefficient K. It will thus be appreciated that the prior art solvent-swelling methods confine the trajectories available for the preparation of stained microparticles to the XZ plane. Multiple sub-populations of dyed microparticles are obtained only by explicitly varying the solvent bath initial dye concentration (for a given number of microparticles to be stained) to produce a corresponding proportional variation in the level of dye incorporated into loading of the particles.

In contrast, the present invention introduces solvent composition as a new variable-to control the process of producing a multiplicity of stained microparticles. It may be appreciated from a consideration of FIG. 2 that the present invention provides for an entire additional dimension of parameter space (Y) for the preparation of stained microparticles by permitting trajectories within a 3-d parameter space (XYZ). For example, starting from the compositions $Z_1^{(1)}$, $Z_2^{(1)}$ and $Z_3^{(1)}$, distinct particle sub-populations displaying well-defined and predictable levels of dye incorporation $Z_1^{(2)}$, $Z_2^{(2)}$, $Z_3^{(2)}$ are prepared by following the non-linear operating curves shown in FIG. 2. At any fixed solvent composition (fixed Y) Z and X are related to each other in a linear fashion (line $OP_1$, for a solvent composition with the volume fraction of tuning solvent $=\phi$).

Accordingly, any point in the three-dimensional parameter space XYZ of FIG. 2 may be approached along a multiplicity of trajectories. In turn, each trajectory permits the preparation of multiple sub-populations of stained microparticles in a predictable manner. The methods of the present invention, by operating in a regime governed by thermodynamic equilibrium and providing quantitative expressions for these trajectories, permit the rational design of protocols for the preparation of multiple sub-populations of stained particles.

Without wishing to be bound by any theory, the operation of the present invention for controlling the partitioning of a solute (dye) between a liquid continuous phase and a dispersed solid phase (microparticles) may be described by the following mathematical relationships.

The equation $Z=G(X,Y)$ governs the transformation of the system from a first state, $\{X_1, Y_1, Z_1\}$ to a desired second state $\{X_2, Y_2, Z_2\}$, wherein the concentration of the solute (dye) in the dispersed (microparticle) phase (Z) is a function of the concentration of solute (X) and solvent composition (Y). The desired second state $\{X_2, Y_2, Z_2\}$ is selected from a multiplicity of possible such second states accessible from the given first state, by adjusting X and Y in a prescribed fashion in accordance with the equation $Z=G(X,Y)$. The relationship is governed by the variables (X), (Y) and (Z), which are defined as follows:

$$X = C^{(S)}\{\phi^{(S)}/\phi^{(P)}\}$$

$$Y = \{\phi^{(P)}/\phi^{(S)}\}$$

$$Z = C^{(P)}$$

wherein:
  $\phi^{(P)} = \{V^{(P)}/(V^{(P)}+V^{(S)})\}$ = volume fraction of particle phase
  $\phi^{(S)} = (1-\phi^{(P)})$ = volume fraction of the solvent phase
  $C^{(S)}$ = concentration of solute in solution phase at equilibrium
  $C^{(P)}$ = concentration of solute in particle phase at equilibrium
  $V^{(P)}$ = volume of particle phase
  $V^{(S)}$ = volume of solvent phase.

The distribution of the solute (dye) between the particle phase (P) and the solvent phase (S) is governed by the partition coefficient, K:

$$K = \{N^{(P)}/N^{(S)}\}$$

wherein $N^{(P)}$ is the number of solute molecules in the particle phase at equilibrium, and $N^{(S)}$ is the number of solute molecules in the solvent phase at equilibrium.

Thus, the value of the partition coefficient K in state 1 is given as $$K_1 = N^{(P)}_1 / N^{(S)}_1$$

and the value of the partition coefficient K in state 2 is given as $$K_2 = N^{(P)}_2 / N^{(S)}_2.$$

Applying the following mass balance equations, $$N^T_1 = N^T_2 \text{ for the total amount of solute} \quad (1)$$

$$N^{(P)}_1 + N^{(S)}_1 + \Delta N^{(S)}_1 = N^T_1 \text{ for the total number of solute in state 1} \quad (2)$$

$$N^{(P)}_2 + N^{(S)}_2 = N^T_2 \text{ for the total number of solute in state 2} \quad (3)$$

wherein $N^T_i$ is the total amount (number) of solute molecules in state i, and $\Delta N^{(S)}_i$ is the number of additional solute molecules added to the solvent phase in state i, results in the following iterative equations:

$$X_2 = \{(1+K_1)/(1+K_2)\} X_1 + \{1/(1+K_2)\} \Delta X_1 \quad (4)$$

$$Y_2 = Y_1 + \Delta Y_1 \quad (5)$$

$$Z_2 = \{(1+K_1^{-1})/(1+K_2^{-1})\} Z_1 + \{1/(1+K_2^{-1})\} \Delta X_1 \quad (6)$$

In the special case of maintaining the variable Y constant, that is, transforming state 1 into state 2 solely by addition of solute so that $K_1 = K_2$, the following equation is obtained:

$$Z_2 = Z_1 + \{1/(1+K^{-1})\} \Delta X_1 \quad (7)$$

Further, the dependence of Z on X and Y is obtained in the form Z=K(Y)X. The dependence of the partition coefficient, K, on Y reflects the fact that addition of tuning solvent to the solvent phase diminishes the capacity of solvent to dissolve the solute and therefore causes redistribution of solute into the available dispersed phase. Specifically, experimental data and analysis support the following functional formula:

$$K = a \exp(bY) \quad (8)$$

where a and b are constants determined from the analysis of data such as those presented in FIG. 6d.

Accordingly, the present invention provides an explicit set of prescriptions to effect the desired state transformation. Specifically, an entire series of second states may be produced by transformation of a single first state.

The above transformation equations, particularly in their iterative form as provided herein, facilitate the automated production of collections of dye-modified microparticles using a personal computer and a standard automated pipetting instrument ("robot") to dispense requisite metered aliquots of dye or other solute as well as tuning solvent. A software application, developed in any standard programming language such as BASIC or C, is used to evaluate the iterative transformation equations. The program computes requisite aliquots of dye and tuning solvent. The pipetting robot is accordingly controlled to meter and dispense these requisite aliquots using a standard laboratory instrument control interface such as a GPIB protocol and a standard software development environment such as LabView (National Instruments). For example, using a master batch as disclosed herein, sets of stained microparticles are readily prepared by such a system by executing the steps of dispensing one or more aliquots of the master batch to produce a first state of the suspension, computing requisite amounts of dye and dye solvent to attain a desired second state of the suspension, dispensing said requisite amounts of solute and dye solvents, and permitting the transformation to occur. These steps are repeated as desired.

Dyeing of functional group-modified microparticles by prior art selling methods may adversely affect the integrity of the functional group. As demonstrated by Example 28, below, functional group-modified particles may be dyed according to the practice of the present invention without loss of functional group integrity.

It may be appreciated that one of ordinary skill in the art may utilize readily available information to select microparticle chemistries, solvents and dyes in accordance with the solubility parameters described herein, for practicing the present invention.

It will also be apparent from the description of the process of the invention that any polymer may be used to provide the polymer particles provided a stable dispersion of the polymer particles is available or can be made. The material may comprise a homopolymer or copolymer, the latter term meant to include not only polymers formed of two monomer units, but also polymers formed of three or more monomer units, sometimes termed "terpolymers". Hydrophobic polymers are preferred. Polymers comprising monomers of the vinyl class, that is, monomers containing the vinyl group, are particularly preferred, most particularly the styrene group. One group of preferred polymers includes polystyrene or polystyrene copolymers containing from about 50% to about 100% by weight styrene monomer units. The polymer optionally may be cross-linked or uncross-linked. In one embodiment, the microparticle is formed of polystyrene cross-linked with 1% divinylbenzene, based on the weight of the microparticle. In another embodiment, the microparticle comprises styrene/methacrylic acid copolymer containing from about 0.6 to about 1% methacrylic acid, based on the weight of the microparticle.

Suitable polymeric materials include, by way of example and not by way of limitation, polymers of the following monomers:

acrylic acid, or any ester thereof, such as methyl acrylate, ethyl acrylate, propyl acrylate, butyl acrylate, 2-ethyl hexyl acrylate or glycidyl acrylate;

methacrylic acid, or any ester thereof, such as methyl methacrylate, ethyl methacrylate, propyl methacrylate, butyl methacrylate, lauryl mathacrylate, cetyl methacrylate, stearyl mathacrylate, ethylene glycol dimethacrylate, tetraethylene glycol dimethacrylate, glycidyl methacrylate or N,N-methacryloxy hydroxy propyl)-(hydroxy alkyl)amino ethyl amidazolidinone;

allyl esters such as allyl methacrylate;

itaconic acid, or ester thereof;

crotonic acid, or ester thereof;

maleic acid, or ester thereof, such as dibutyl maleate, dioctyl maleate, dioctyl maleate or diethyl maleate;

styrene, or substituted derivatives thereof such as ethyl styrene, butyl styrene or divinyl benzene;

monomer units which include an amine functionality, such as dimethyl amino ethyl methacrylate or butyl amino ethyl methacrylate;

monomer units which include an amide functionality, such as acrylamide or methacrylamide;

vinyl-containing monomers such as vinyl ethers; vinyl thioethers; vinyl alcohols; vinyl ketones; vinyl halides, such as vinyl chlorides; vinyl esters, such as vinyl acetate or vinyl versatate; vinyl nitriles, such as acrylonitrile or methacrylonitrile;

vinylidene halides, such as vinylidene chloride and vinylidene fluoride;
tetrafluoroethylene;
diene monomers, such as butadiene and isoprene; and
allyl ethers, such as allyl glycidyl ether.

Particularly preferred homopolymers and copolymers comprising vinyl-containing monomers include polystyrene, poly(methyl methacrylate), polyacrylamide, poly(ethylene glycol), poly(hydroxyethylmethacrylate), poly(vinyltoluene) and poly(divinylbenzene).

Suitable polymeric materials may include, by way of example and not by way of limitation the following polymers: polyoxides, such as poly(ethylene oxide) and poly(propylene oxide); polyesters, such as poly(ethylene terepthalate); polyurethane; polysulfonate; polysiloxanes, such as poly(dimethyl siloxane); polysulfide; polyacetylene; polysulfone; polysulfonamide; polyamides such as polycaprolactam and poly(hexamethylene adipamide); polyimine; polyurea; heterocyclic polymers such as polyvinylpyridine and polyvinyl pyrrolidinone; naturally occurring polymers such as natural rubber, gelatin, cellulose; polycarbonate; polyanhydride; and polyalkenes such as polyethylene, polypropylene and ethylene-propylene copolymer.

The polymeric material may contain functional groups such as carboxylates, esters, amines, aldehydes, alcohols, or halides that provide sites for the attachment of chemical or biological moieties desirable to enhance the utility of the particles in chemical or biological analyses. Methods for preparing microparticles from such polymers are well known in the art. Representative procedures for preparing microparticles as well as cross-linked microparticles are set forth in the Preparative Examples, below.

The methods of the present invention also may be applied to the staining of core-shell microparticles. Core-shell microparticles comprise a central core of one or more core polymers and a shell of one or more shell polymers containing the core. The polymer shell may be formed by any polymer-coating technique. Core-shell morphology is thermodynamically favored if the shell-forming polymer exhibits higher polarity, or lower interfacial tension than does the core-forming polymer. Core-shell morphology also is favored if the volume fraction of the shell-forming polymer is greater than that of the core-forming polymer. Thus, synthesis of core-shell particles is performed at a shell/core weight ratio greater than 1. In certain embodiments, the core polymer is hydrophobic and the shell polymer is relatively hydrophilic and carries functional groups of interest.

Copolymers of styrene and a monomer more hydrophilic than styrene (e.g., methacrylic acid) are preferred for the core polymer over polystyrene homopolymer. The comonomer serves to decrease the hydrophobicity of the core and to render it more compatible with the hydrophilic shell polymerization compositions.

Within these constraints, any monomer or combination of monomers may be selected as the shell polymer. A mixture of vinyl monomers is preferred. According to one embodiment of the invention, a monomer mixture of methyl methacrylate as the major constituent, and hydroxyethyl methacrylate and methacrylic acid as minor constituents, is used to form a shell over a polystyrene or modified polystyrene core. One such monomer mixture is composed of, by weight, about 6% hydroxyethyl mbthacrylate, from about 5% to about 20% methacrylic acid, the balance being methyl methacrylate. These monomers are more hydrophilic than polystyrene.

Microparticle size may be chosen appropriately for the intended end use. Typically, particles will range in size from about 0.1 to about 100 microns in diameter, more typically from about 0.5 to about 50 microns, even more typically from about 2 to about 10 microns. Preferably, the microparticles are "monodisperse", that is, microparticles in a set have a narrow size range, preferably displaying a coefficient of variation of the mean diameter ("CV") of no more than about 5%.

Microparticles may be rendered magnetically responsive by incorporation of an appropriate magnetic material, before or after staining, according to well-known procedures. According to one such method, particles are impregnated with a ferrofluid, such as a ferrofluid prepared according to Example 19. By "magnetically responsive" is meant the ability to change location or orientation in response to application of a magnetic field.

The dye may comprise any dye that imparts a visual or machine-observable color or fluorescence. The color or fluorescence may be detectable with the naked eye or with the aid of a microscope or other optical instrument. The preferred fluorescent dyes are styryl dyes, such as p-bis(o-methylstyryl)benzene; pyromethane dyes such as fluorescent green dye 4,4-difluoro-5,7-dimethyl-4-bora-3a,4a-diaza-s-indacene-3-pentanoic acid, succinimidyl ester and the fluorescent orange dye 4,4-difluoro-5-(2-thienyl)-4-bora-3a,4a-diazo-s-indacene-3-propionic acid-succinimidyl ester; and coumarin dyes such as methoxycoumarin. Preferred are those fluorescent dyes having emission wavelengths in the range from about 400 nm to about 1000 nm. When more than one dye is used, the dyes can be selected so that they have substantially different absorption spectra, emission spectra or emission lifetimes.

According to one embodiment, the microparticle comprises a polystyrene polymer or copolymer and the dye is a hydrophobic dye. Possible solvents are selected, for example, from Table 1.

TABLE 1

Candidate solvents for polystyrene microparticle and hydrophobic dye combination

| Solvent #1: Good solvent for hydrophobic dye and polystyrene microparticle (Dye Solvent) | Solvent #2: Weak solvent or non-solvent for hydrophobic dye and polystyrene microparticle (Tuning Solvent) | Solvent #3: Weak solvent or non-solvent for hydrophobic dye and polystyrene microparticle (Co-Solvent) |
|---|---|---|
| methylene chloride chloroform tetrahydrofuran dioxane cyclohexane benzene toluene butylacetate lower chlorinated aliphatic hydrocarbons. | water | Acetone lower alcohols, especially methanol, ethanol and isopropanol |

A representative system utilizing a polar, water-soluble dye is composed of poly(ethylene oxide) microparticles in a ternary solvent system comprising water as Solvent #1; hexane as Solvent #2; and dioxane as Solvent #3.

From the solvents listed in the above table and a standard solvent miscibility chart, several ternary solvent systems may be designed for a combination of polystyrene polymer or copolymer and hydrophobic dye in accordance with the present invention. For example, a hydrophobic dye solute may be dissolved in a liquid phase consisting of a homogeneous ternary mixture of water (tuning solvent, Solvent #2), alcohol (co-solvent, Solvent #3) and dichloromethane (dye solvent, Solvent #1) and contacted with a solid polymeric phase consisting of polystyrene or polystyrene copolymer microparticles. The dye partition coefficient, K, governing the relative abundance of dye in the polymeric phase vs. that in the ternary solvent mixture, increases as the volume fraction of tuning solvent in the liquid phase increases, and correspondingly decreases as the volume fractions of dye solvent or cosolvent decreases). In addition to the water/alcohol/dichloromethane ternary system disclosed, other representative ternary systems include, for example, water/acetone/methylene chloride.

The invention has been described for purposes of illustration as containing one each of Solvent #1, Solvent #2 and Solvent #3, the characteristics of which have been described above. However, it is possible to practice the invention by including more than one solvent in each category. For example, the solvent mixture may contain a single solvent of type #1, two solvents of type #2, and a single solvent of type #3.

The microparticles of the invention may be functionalized to include chemical or biological entities such as, for example, nucleic acids and fragments thereof, including aptamers, proteins, peptides, and small organic molecules. The attachment of such molecules can be performed using processes known in the art, for example, a covalent coupling reaction. See, e.g., G. T. Hermanson, *Bioconjugate Techniques* (Academic Press, 1996) and L. Illum, P. D. E. Jones, *Methods in Enzymology* 112, 67-84 (1985), the entire disclosures of which are incorporated herein by reference. These entities can be selected depending on the assay of interest. Examples of such assays are disclosed in PCT/US01/20179 and U.S. Pat. No. 6,251,691, which are incorporated herein by reference in their entirety.

Figure 1B:
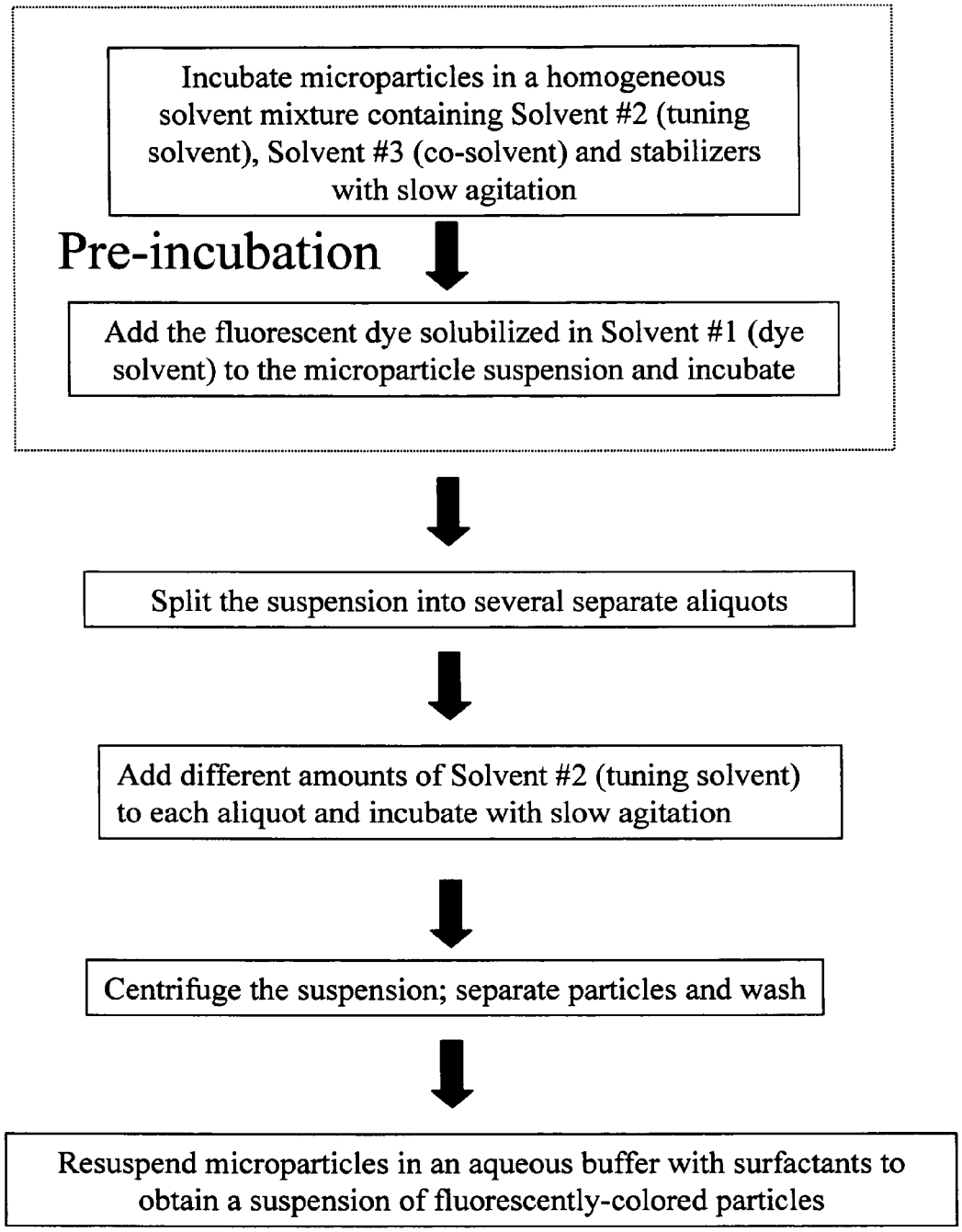
FIG. 1(b) is a diagram of the sequence of steps of an embodiment of the invention.

One embodiment of the method of the invention is diagrammatically summarized in FIG. 1(b). Microparticles are first incubated with a solvent solution comprising Solvent #2 and Solvent #3 in the presence of optional stabilizers to form a suspension. The function of the stabilizer is to prevent the destabilization of the suspension of microparticles. Representative stabilizers include polymers, particularly polymeric alcohols, such as polyvinyl alcohol; polymeric oxides, such as polyethylene oxide; polyvinyl polymers, such as polyvinylpyrrolidone; poly acids, such as polyacrylic acid. Other representative stabilizers include ionic surfactants, such as sodium dodecylsulfate and Aerosol OT; and non-ionic surfactants, such as polyoxyethylene sorbitan monolaurate and polyethyleneglycol tert-octylphenyl ether. The concentration of the stabilizer may range from about 0% to about 2%, by weight of the solvent/microparticle suspension.

The suspension is preferably subjected to slow agitation. The incubation is typically conducted at room temperature, but higher or lower temperatures may be utilized so long as the integrity of the microparticles is not adversely affected, and the solvent composition remains stable. The incubation is conducted to permit the optional stabilizer to adsorb onto the microparticles. The requisite pre-incubation time will vary according to the composition of the solvents and microparticles, and may be selected accordingly.

Following the above first incubation step, dye solubilized in dye solvent (Solvent #1) is then added to the microparticle suspension. Sufficient dye should be added to ensure incorporation of dye to the desired level in order to generate a detectable dye signal. The incubation is carried typically out at room temperature, but higher or lower temperatures may be used. The second incubation is conducted to permit the dye solvent (Solvent #1) to penetrate the microparticles.

It has been found that the combination of a first step of incubating particles with a mixture of a Solvent #2 and a Solvent #3, and optional stabilizers(s), followed by a second step of adding dye dissolved in Solvent #1, substantially decreases the need for intense mechanical or acoustic mixing during the dyeing step, as required by prior art protocols. The particles require only mild agitation during the dyeing process in order to keep them suspended. This is a significant improvement because intense mixing requires specialized equipment and is difficult to scale up.

According to one embodiment, the concentration of dye in the microparticle suspension is selected in the range from about 1 µg/g of particles to about 100 µg/g of particles, based upon the weight of the particle suspension. Concentrations below and above this range may be appropriate in some applications depending on the composition of the solvent solution and microparticles.

An amount of tuning solvent is then slowly added to favor partitioning of dye into the microparticles, while the suspension is slowly agitated. The volume fraction, $\phi$, of tuning solvent is selected so as to attain a desired endpoint composition along a trajectory in FIG. 2.

The tuning solvent should be added at a controlled rate to maintain phase stability in the suspension. By "phase stability" is meant a condition characterized by the presence of an essentially homogeneous mixture of solute (dye) and liquid phase. Under a condition of phase stability, the dye remains dissolved in the solution phase while being incorporated into the microparticles. The dye does not precipitate out of the solvent. Phase stability is further characterized by the absence of liquid-liquid phase separation.

According to prior art methods, complete uptake of the dye into the microparticle phase must be obtained so that the dye loading of the microparticles may be derived with certainty, based upon the initial dye amount in the solvent bath and the microparticle volume. In such methods, the precise level of dye loading should be known to ensure that the dye signal emitted is within the dynamic range of instruments utilized for detecting that signal. An accurate determination of the dye loading is particularly important when a library of particles is to be constructed, and different particle sets are to be distinguished by different loadings of the same dye. Thus, the level of dye incorporation must be monitored until no more dye is apparent in the suspension continuous phase, signaling that substantially all the dye introduced into the system has been take up by the microparticle phase.

According to the present invention, the amount of dye incorporated into the microparticles is precisely controlled by modulating the amount of tuning solvent added to the microparticle suspension, as determined by the iterative equations discussed above. A pre-selected level of dye loading may be delivered with certainty, even in the absence of complete partitioning of the dye into the microparticle phase. By "complete partitioning" with respect to a solute (e.g., dye) is meant the state characterized by essentially complete uptake of the solute from the liquid phase to the microparticle phase, and the essentially complete absence of dye from the liquid phase. Thus, it is not necessary to monitor the status of dye migration from the liquid phase of the microparticle suspension into the microparticle phase to ensure that all dye in the system has been taken up by the microparticles, as complete dye uptake is not critical to the control of the dye loading.

The suspension of microparticles in the staining bath should be incubated for a period of time so as to provide substantially uniform partitioning of dye into the microparticles.

To complete the process, the microparticle suspension is centrifuged, and the microparticles are optionally washed and resuspended in a suitable buffer, typically an aqueous buffer containing optional surfactants. The resulting microparticles comprise a set of dyed particles containing a pre-determined, specific amount of dye that permits the identification of particles from a given set.

Figure 3A:
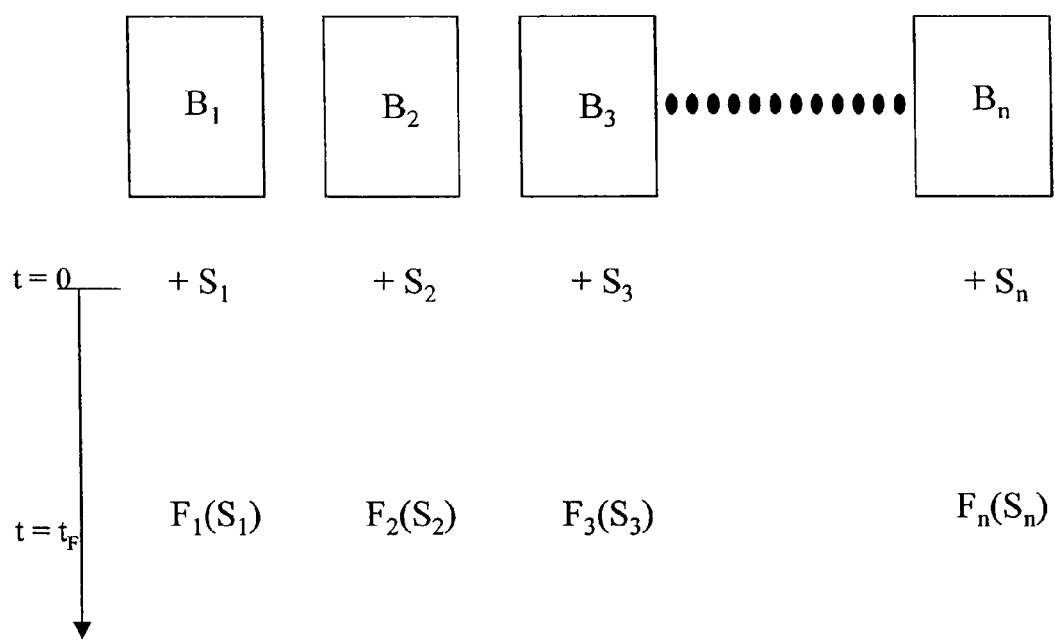
FIG. 3(a) is a schematic diagram of a parallel processing embodiment of the invention for producing n sub-populations ($F_n(S_n)$) of fluorescently stained microparticles, from n solvent system/microparticle suspensions $B_n$. Each suspension contains a designated amount $S_n$ of tuning solvent.

According to one embodiment, sub-populations of polymer microparticles containing different levels of incorporated dye may be produced in parallel fashion. Pre-calculated amounts of tuning solvent are added to separate aliquots of microparticle suspension pre-incubated in dye solution. In accordance with the present invention, the level of dye partitioning into the microparticles is determined by the final volume fraction of tuning solvent and the initial dye concentration in the suspension. This approach is illustrated in FIG. 3(a), where the various pre-incubated aliquots are denoted as $B_n$. The respective amounts of tuning solvent introduced into each aliquot are represented as $S_n$, and the corresponding resulting sub-populations of particles in each batch are denoted as $Fn(S_n)$.

Figure 3B:
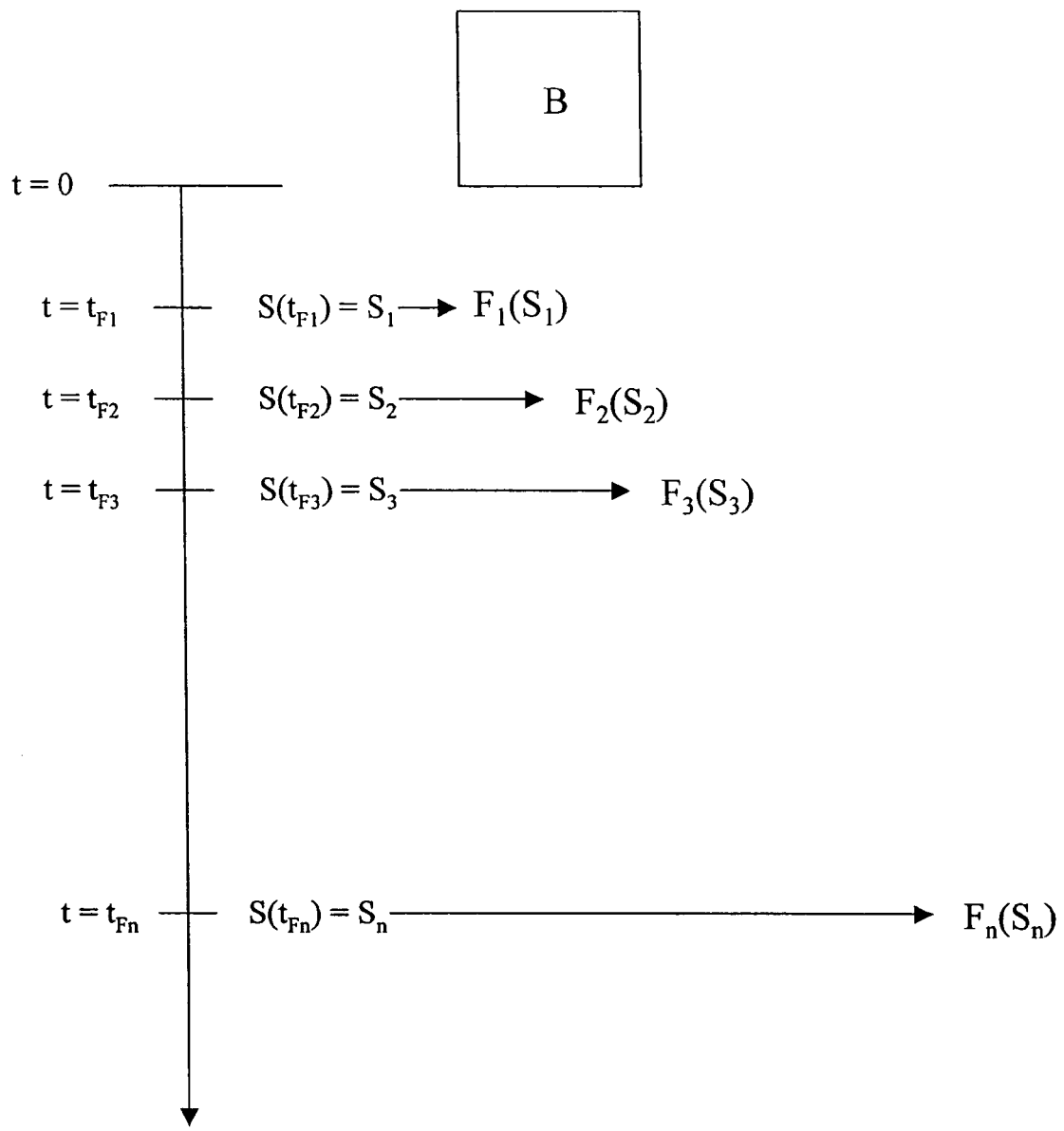
FIG. 3(b) is a schematic diagram of a serial processing embodiment of the invention for producing n sub-populations of fluorescently stained microparticles from a single reaction. [B] Represents a pre-incubated master-batch of solvent system/microparticle suspension, to which a continuous stream of tuning solvent is fed. $F_n(S_n)$ represent fractions of the microparticle suspension removed from the master-batch at times $t=t_{Fn}$. The fractions contain $S_n$ amounts of tuning solvent.

According to another embodiment of the invention, sub-populations of polymer microparticles containing different levels of dye are produced in a serial fashion. From a master-batch microparticle suspension in dye solution, aliquots are withdrawn at different elapsed times during continuous or semi-continuous addition of the tuning solvent to the microparticle suspension in dye solution. In "semi-continuous" addition of tuning solvent, the process is momentarily interrupted, for example, to permit the operation of removing a sample of microparticles from the batch. Fractions of the suspension $F_n(S_n)$ collected at successive elapsed times ($t_{Fn}$), contain correspondingly differing amounts of solvent $S_n$ and yield multiple sub-populations of stained particles from the same master batch. These sub-populations corresponding to levels of dye incorporation will produce correspondingly differing fluorescence intensities. This approach is illustrated in FIG. 3(b) wherein [B] denotes the pre-incubated masterbatch, to which a continuous stream of the tuning solvent is fed. $F_n(S_n)$ are the fractions of the microparticle suspension collected from the master-batch at successive lapsed times, $t_{Fn}$, respectively.

Figure 3C:
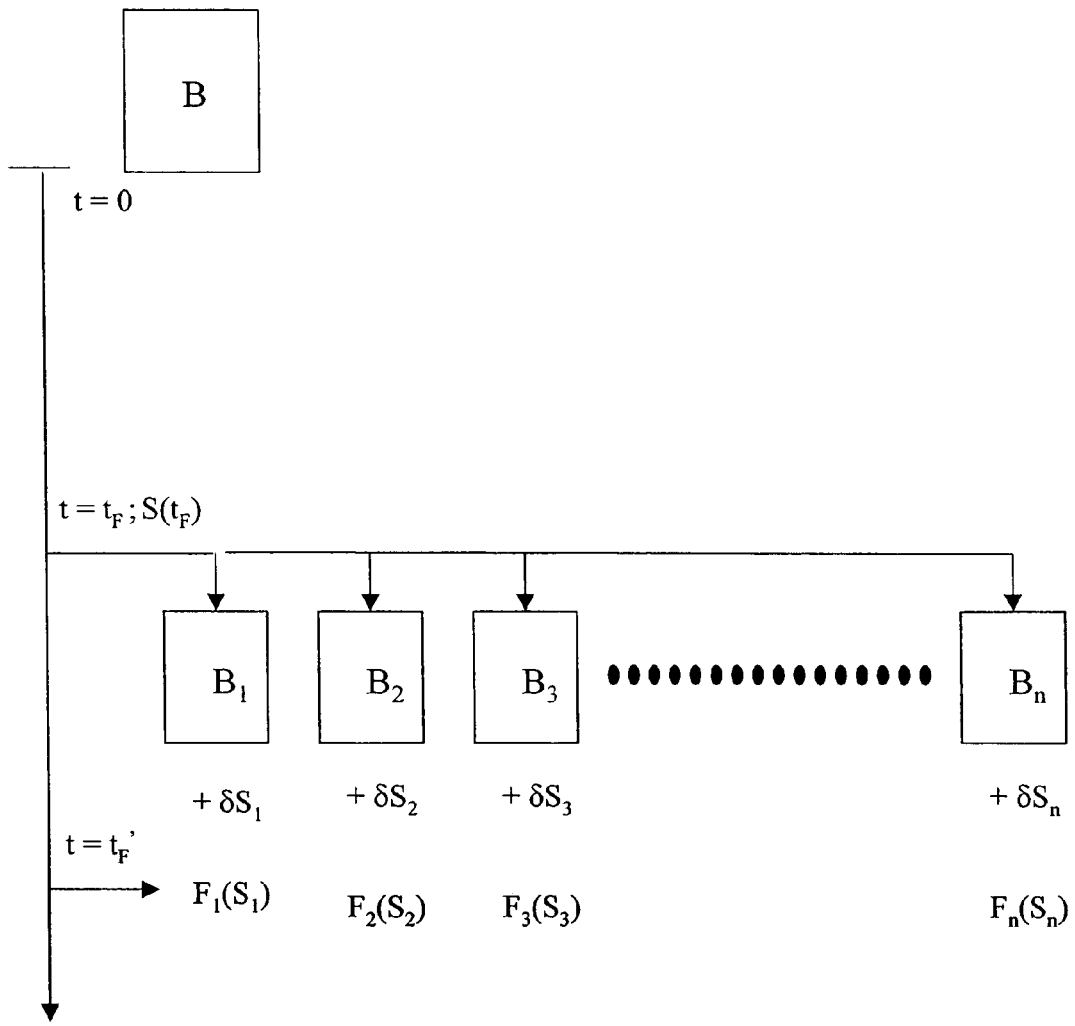
FIG. 3(c) is a schematic diagram of an embodiment of the invention for producing n sub-populations $F_n(S_n)$ of fluorescently stained microparticles by a combination of series and parallel processing. [B] Represents a pre-incubated master-batch of solvent system/microparticle suspension to which a known amount of tuning solvent, $S(t_F)$, is fed. The master-batch is then split into n different aliquots, $B_n$, to which n different designated amounts of tuning solvent, $\delta S_n$, are added.

Alternatively, when a specified time ($t_F$) has lapsed, the continuous addition of tuning solvent is interrupted, and the suspension of dyed microparticles is divided into two or more aliquots for adjustment of final dye content by solvent tuning. A selected amount of tuning solvent ($\delta S_n$) is added to each aliquot so as to produce different levels of dye incorporation in at least two aliquots, each said level being determined by the total amount of tuning solvent added during solvent tuning and to the initial dye concentration. It may be appreciated that the selected amount of tuning solvent added to each aliquot may comprise zero in one or more aliquots, provided that a non-zero amount of tuning solvent is added to at least one of the aliquots. This serial-followed-by-parallel processing approach is illustrated in FIG. 3(c).

Figure 3D:
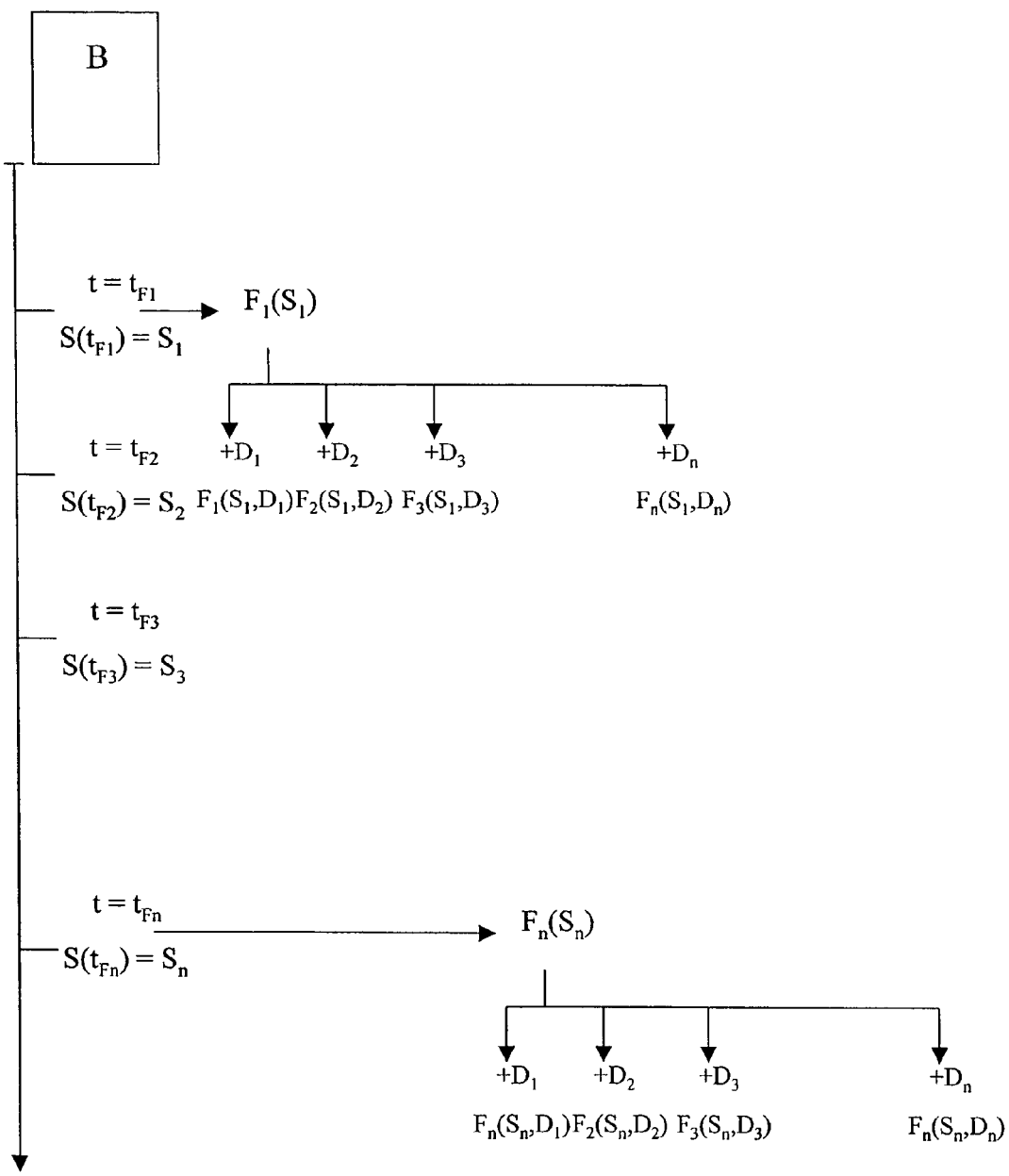
FIG. 3(d) is a schematic diagram of an embodiment of the invention for producing mxn sub-populations $F_m(S_m, D_n)$ of fluorescently stained microparticles by serial followed by parallel processing, using a combination of solvent tuning and dye addition. $S_m$ denotes the amounts of tuning solvent, and $D_n$ the amounts of fluorescent dye, added to the various sub-populations $F_m(S_m, D_n)$.

Other variations of serial and parallel processing are possible. FIG. 3(d) illustrates a process combining serial and parallel processing, employing both solvent tuning and direct adjustment of dye concentration. As shown in FIG. 3(d), a continuous stream of tuning solvent is fed into master-batch [B]. Fractions of microparticle suspension $F_n(S_n)$, respectively containing $S_n$ amounts of the tuning solvent, are collected. Each fraction is then subjected to a separate labeling step, initiated, for example, by addition of a third dye, $D_n$, permitting discrimination of microparticles in previously identical aliquots. The labeling steps respectively involving dyes $D_1, D_2, \ldots D_n$ produce distinguishable sub-populations $F_m(S_m, D_n)$ from each aliquot.

Microparticles from each aliquot comprise a set of particles containing a pre-determined, specific amount of one or more fluorophores (or chromophores) permitting the identification of particles from a given set.

The method of the present invention may be adapted to provide a library of combinatorially encoded microparticles by sequential addition of solutions of distinguishable fluorescent dyes. The microparticles are encoded in accordance with any one of a variety of available codes, including binary codes. Preferably, the microparticles are encoded with a binary encoding method that permits in-situ decoding, such as the method of WO 98/53093, the entire disclosure of which is incorporated herein by reference.

The practice of the invention is illustrated by the following non-limiting examples.

PREPARATIVE EXAMPLE 1

Non-Cross-Linked Polystyrene Homopolymer Particles

A 100-ml round bottom glass flask, equipped with a reflux condenser, $N_2$ inlet-outlet adapter and an agitator, was placed in a jacketed oil bath. The flask was charged with a solution of 0.9475 g of polyvinylpyrolidone (Aldrich, average molecular weight about 29,000) in 43.3 ml of ethyl alcohol (Aldrich, 200 proof, anhydrous, 99.5%) and 18.95 g styrene. In order to remove free oxygen, the system was purged with $N_2$ for one half hour under mild agitation (50-70 rpm). Then, the temperature was raised to 70° C. and the agitator speed to 350 rpm. Polymerization of styrene monomer was initiated by adding 10 ml of a solution of 2.4 wt % 2,2'-azobisisobutyronitrile in ethanol. After 17 hours of reaction, the system was cooled to room temperature. Monodisperse polystyrene particles having a volume average diameter of 4.1 μm were obtained. The monomer conversion efficiency was 96.4% and the solids content of the final latex was 27.9%.

PREPARATIVE EXAMPLE 2

Non-Cross-Linked Copolymer Particles

The same procedure as Preparative Example 1 was used to prepare a polystyrene copolymer containing 3% methacrylic acid, by reacting 10.5 g of a mixture of styrene and methacrylic acid monomers (3 wt. % methacrylic acid monomer, based upon the total monomer weight). Monodisperse particles were obtained. The final conversion was 95.7%, particle diameter 3.2 μm, and the latex contained 15.9% solids. The copolymer particle had a parking area of 2.45 μm²/COOH group.

PREPARATIVE EXAMPLE 3

Cross-Linked Copolymer Particles

A 100-ml round bottom flask equipped with a reflux condenser, $N_2$ inlet-outlet adapter, and agitator was placed in a jacketed oil bath. The flask was charged with 1.5 g of polyvinylpyrolidone (as in Preparative Example 1), 0.475 g of sodium dioctyl sulfosuccinate (Aldrich, 98%), 53.5 ml of ethyl alcohol (Aldrich, 200 proof, anhydrous, 99.5%), 9.405 g styrene and 0.095 g divinylbenzene (Aldrich, mixture of isomers, 80% purity). After removing the free oxygen by purging $N_2$ for 30 min., the temperature was raised to 70° C. The polymerization was started by adding 0.095 g of 4,4'-azobis(4-cyanovaleric acid) (Aldrich, 75%) dissolved in 10 ml of ethanol. After 27 hours, the reaction was stopped by cooling to room temperature. Monodisperse particles were obtained. The monomer conversion was 93% and the particle volume average diameter was 1.6 μm.

PREPARATIVE EXAMPLE 4

Non-Cross-Linked Core-Shell Particles

A 100 ml three-neck round bottom flask, equipped with a mechanical stirrer, an inlet-outlet $N_2$ purge and a condenser was placed in a thermostatted water bath at 70° C. To the flask 5.48 g of a latex containing 12.3 wt. % polystyrene monodisperse particles having a diameter of 3.15 μm was added. To this latex a solution 0.009 g sodium dodecyl sulfate and 0.007 g sodium bicarbonate dissolved in 43.3 ml of distilled deionized water was added. The suspension was agitated at 100 rpm and allowed to reach 70° C. under $N_2$ purge. When the temperature of the reaction mixture was stable, 0.0068 g of potassium persulfate in 0.5 ml of distilled deionized water was added. Immediately following this the reaction was started by feeding a mixture of 0.676 g of a mixture of 74% methyl methacrylate, 6% hydroxymethyl methacrylate and 20% methacrylic acid at a rate of 0.01 ml/min with a syringe pump. After the completion of feeding (1.2 h) the reaction was allowed to proceed under agitation for 2 additional hours at 70° C. The reaction was then quenched by adding 0.0068 g of hydroquinone in 1 ml water and cooled rapidly to room temperature. A latex of 2.75 wt. % solids having monodisperse core-shell particles of 3.32 μm diameter was obtained. The surface carboxyl group parking area was 1.52 Å$^2$/group.

EXAMPLE 1

Synthesis of Fluorescent Green Non-Cross-Linked Microparticles (Dye/Polymer=0.334 mg/g)

Figure 4:
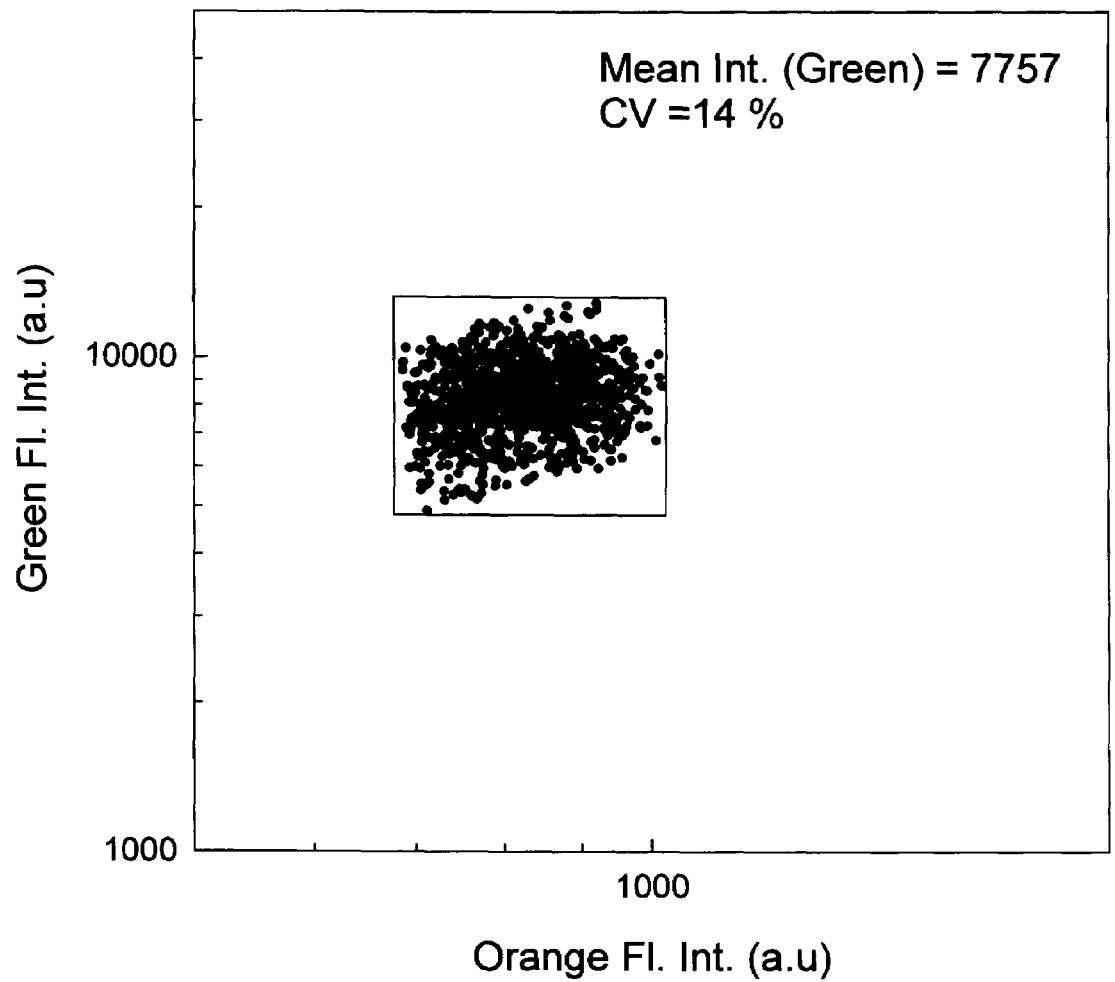
FIG. 4 is a plot of the fluorescence of the collection of particles prepared according to Example 1, below.

A 25 ml three neck round bottom glass flask was charged with 0.05 g of cleaned (1 ml ethanol, three rounds of centrifugation (6500 rpm at room temperature) and redispersion) and non-cross-linked copolymer particles, added as 0.312 ml of the latex as prepared in Preparative Ex. 2. To the particle suspension, 1 ml sodium dodecyl sulfate solution ("SDS") (0.75 wt. %), 1.5 ml poly(vinyl alcohol) (Aldrich, molecular weight 85,000-146,000, hydrolyzed grade 87-89%) as a 0.1% water solution, and 4.75 ml of ethanol were added. To this mixture, 0.0835 ml of a dichloromethane (Aldrich, 99.9%) solution containing 0.0167 mg of fluorescent green dye, Bodipy FL C5, SE (4,4-difluoro-5,7-dimethyl-4-bora-3a,4a-diaza-s-indacene-3-pentanoic acid, succinimidyl ester, Mw=417.22, Molecular Probes) was added. Finally, 10.6 ml of distilled deionized water was added and the mixture agitated for another 2 hours. The whole mixture was then transferred to a 50 ml plastic centrifuge tube and centrifuged at 4500 rpm for 1 min. The supernatant was removed and the pellet containing the colored beads was washed three times with 2 ml of ethanol, and finally resuspended in 2 ml of 0.2% SDS solution. The ratio of green dye to polymer was 0.334 mg/g. The intensity and the uniformity of the green fluorescence were determined using a Nikon fluorescence microscope with a charge-couple device (CCD) camera and image acquisition software. The results are shown as a scatter plot in FIG. 4 The ordinate of each spot represents the green fluorescence intensity associated with a single particle; data were not corrected for background signal/noise.

EXAMPLE 2

Preparation of Green Fluorescent Cross-Linked Microparticles (Dye/Polymer=1.667 mg/g)

Figure 5:
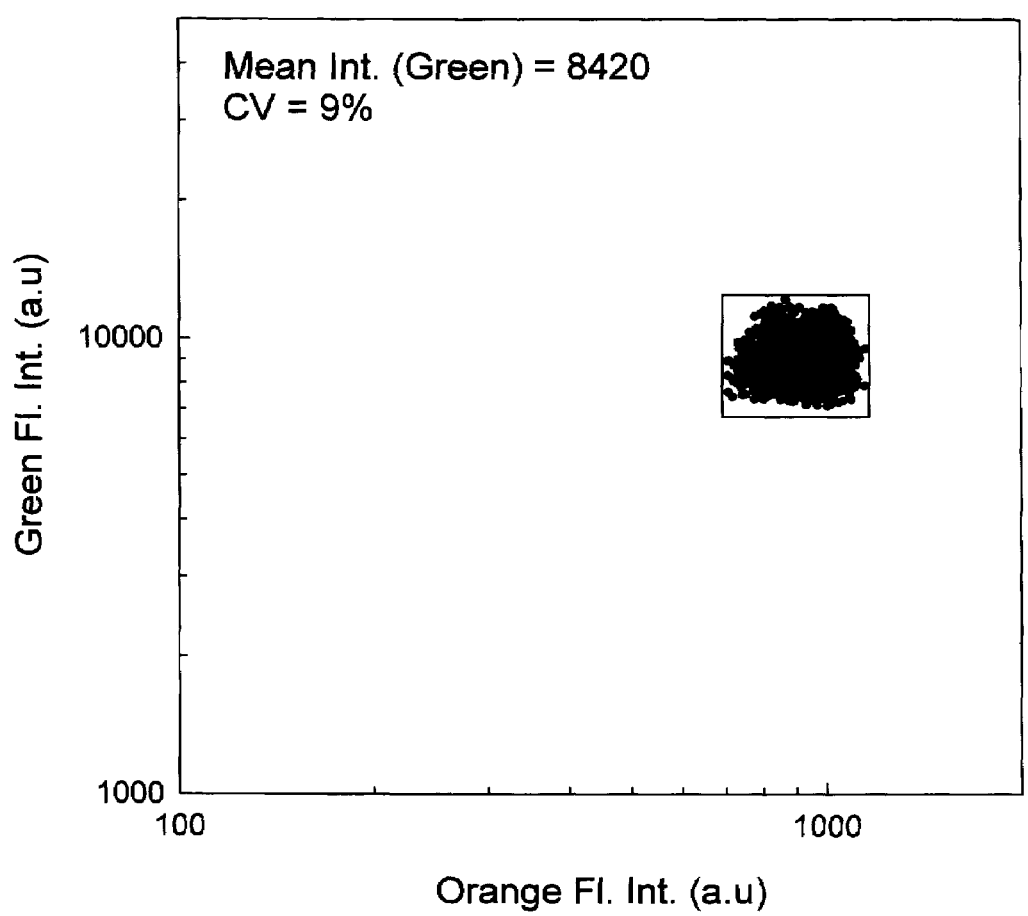
FIG. 5 is a plot of the fluorescence of the collection of particles prepared according to Example 2, below.

This example is similar to Example 1, except that the polymer particles had a cross-linked structure, and the scale of the experiment was increased four-fold. A 2 ml latex emulsion containing 0.2 g of cross-linked core-shell particles (Bangs Laboratories, Inc., 3.2 μm, 10% solids, 12.5% divinylbenzene) was cleaned of emulsifier by adding 1 ml ethanol and centrifuging at 6500 rpm for 2 min. This operation was repeated 3 times. The cleaned polymer particles were transferred to a 100 ml round bottom flask filled with 6 ml of an aqueous solution of 1.0 wt. % polyvinyl alcohol, 4 ml of a aqueous solution of 0.75 wt. % SDS and 19 ml ethanol. To this mixture, 1.5 ml of $CH_2Cl_2$ containing 0.3334 mg of fluorescent green dye, Bodipy FL C5, SE, was added. After this, 53 ml of distilled deionized water was added. The particle suspension was then transferred to a rotary evaporator and the solvents were removed under vacuum (26.5 Hg inches) while the temperature was gradually increased to 40° C., then to 56° C., and finally to 63° C. for removal of the organic solvents. The concentrated colored suspension was collected and centrifuged at 6500 for 2 min. and the supernatant discarded. The microparticle pellet was washed by three rounds of centrifugation and resuspended with 5 ml ethanol. Finally, the cleaned colored beads were resuspended in 2 ml SDS 0.2 wt. % to a concentration of about 10% solids. The ratio of green dye to polymer was 1.667 mg/g. The intensity and the uniformity of the green fluorescence were determined using a Nikon fluorescence microscope with attached CCD camera and image acquisition software. The results are shown as a scatter plot in FIG. 5. The ordinate of each spot represents the green fluorescence intensity associated with a single particle; data were not corrected for background signal/noise.

EXAMPLE 2A

Library of Fluorescent Green Dye-Encoded Cross-Linked Microparticles (Initial Dye/Polymer Concentration=0.833 mg/g)

The procedure of Ex. 1 was followed, except that the green fluorescent dye amount in the $CH_2Cl_2$ solution was 166.67 mg and the water feed rate was 21 ml/h. During the course of water addition, four separate fractions were withdrawn at a time interval of 30 minutes apart. The serial run thus generated five different populations of colored particles (one fraction was collected before starting the water feed) with each population having a distinct mean fluorescence intensity, which was a function of the amount of water added at the fraction, was withdrawn. The particles were analyzed according to the procedure described in Ex. 1. The green fluorescence intensity value measured for each type of colored particles is presented in Table 1a. In Table 1a, and elsewhere herein, "a.u." means arbitrary units.

TABLE 1a

| | Green fluorescence intensity values for samples withdrawn in Ex. 2A. | |
| --- | --- | --- |
| Fraction # | Added water/polymer (ml/g) | Particle fluorescence intensity (a.u.) |
| 1 | 52.5 | 283.4 |
| 2 | 105.0 | 1396 |
| 3 | 157.5 | 3623 |
| 4 | 210.0 | 13061 |
| 5 | 262.5 | 14658 |

EXAMPLE 2B

Library of Dual-Colored Non-Cross-Linked Microparticles Encoded with Green and Orange Fluorescent Dyes (Initial Dye/Polymer Concentration: Green Dye/Polymer=Orange Dye/Polymer=0.75 mg/g)

A set of distinguishable dual-colored non-cross-linked particles encoded with green and orange fluorescent dyes was produced by invoking the serial solvent tuning method of the present invention, using the following initial dye concentrations: Green fluorescent dye/polymer=0.75 mg/g; orange fluorescent dye/polymer=0.75 mg/g. Three separate fractions were collected according to the methodology of Example 2A above, except that two fluorescent dyes were present in the initial pre-incubation suspension. The amounts of water added until the time of fraction withdrawal and the mean intensities of the different fractions of microparticles collected are shown in Table 1b.

TABLE 1b

Green and Orange Fluorescent Intensities from Ex. 2B (26.5 ml/h water fed rate)

| Fraction # | [Green]/polymer mg/g | [Green]/polymer mmol/g × $10^{-3}$ | [Orange]/polymer mg/g | [Orange]/polymer mmol/g × $10^{-3}$ | Fed water/ polymer ml/g | Green fluorescent intensity (a.u.) | Orange fluorescent intensity (a.u.) |
|---|---|---|---|---|---|---|---|
| 1 | 0.75 | 1.79 | 0.75 | 1.69 | 265.0 | 1220 | 1388 |
| 2 | 0.75 | 1.79 | 0.75 | 1.69 | 265.0 | 7082 | 7798 |
| 3 | 0.75 | 1.79 | 0.75 | 1.69 | 265.0 | 11698 | 15479 |

EXAMPLES 3-6

Analysis of Dye Partitioning in the Preparation of Green Fluorescent Cross-Linked Microparticles Four separate green fluorescent-dyed particle preparations were prepared by a protocol as in Ex. 2, but on a smaller scale, comparable to the scale of Ex. 1. The respective amounts of water added were: 0.833 ml, 1.74 ml, 5.31 ml and 10.59 ml, corresponding to water volume fractions of 0.398, 0.463, 0.623 and 0.738, respectively. Following completion of dye incorporation, the colored particles were centrifuged. The supernatant was saved in order to determine, the green dye remaining in solution. Accordingly, equal amounts of each of the four supernatant solutions were diluted (24×) with alcohol and fluorescence spectra were recorded. The emission intensity values (see Table 2) were used to calculate the concentration of green dye remaining in each solution according to the calibration curve of FIG. 6($a$). The concentration of green dye concentration incorporated into the particles was calculated as the difference between the total initial amount of green dye in the reaction and that remaining in the supernatant. These values are shown in Table 2.

FIG. 6($b$) shows the nonlinear variation of incorporated dye content as a function of water volume fraction.

The calculated incorporated green dye content also was correlated to the intensity of green fluorescence recorded by fluorescence microscopy from stained particles. The results in FIG. 6($c$) display a linear correlation.

FIG. 6($d$) shows the partition coefficient of the dye, K, plotted against Y. The curve exhibits a characteristic exponential dependence illustrating the fine-tuning of dye incorporation by way of modulation of the solvent composition in accordance with the present invention.

EXAMPLE 7

Cross-Linked Particles Containing Green Fluorescent Dye (Dye/Polymer=0.833 mg/g)

The procedure of Example 2 was followed, except that the green dye solution in $CH_2Cl_2$ added to the particle suspension had a concentration of 0.1 mg/ml, and the experiment was run at half the scale in a 50 ml flask. Accordingly, the amount of water added following the addition of the dye solution, was

TABLE 2

Dye partitioning details

| Ex. # | Dye bath water volume fraction | Supernatant fluorescence intensity (a.u.) | Supernatant dye conc. (from calibration curve) (μg/ml) | Initial dye conc. (μg/ml) | Dye incorporated in particles (μg/mg) (calculated) | Measured particle fluorescence intensity |
|---|---|---|---|---|---|---|
| 3 | 0.39806 | 580.4 | 1.808 | 1.929 | 0.0208 | 135 |
| 4 | 0.4629 | 494.15 | 1.539 | 1.72 | 0.0348 | 539 |
| 5 | 0.6227 | 270.1 | 0.841 | 1.205 | 0.0997 | 2909 |
| 6 | 0.73823 | 54.34 | 0.169 | 0.834 | 0.2639 | 7581 |

1.765 ml. The colored particles were recovered and washed by repeated centrifugation and re-dispersion.

EXAMPLES 8-10

Cross-Linked Particles Containing Green Fluorescent Dye

The procedure of Example 7 was followed to generate three additional particle sets, except that the water amounts were 5.3 ml, 10.6 ml and 21.2 ml, respectively.

EXAMPLE 11

Cross-Linked Particles Containing Orange Fluorescent Dye (Dye/Polymer=0.334 mg/g)

The procedure of Example 7 was followed, except that the dye was orange Bodipy 558/568, SE (4,4-difluoro-5-(2-thienyl)-4-bora-3a,4a-diaza-s-indacene-3-propionic acid, succinimidyl ester, Mw=443.23, Molecular Probes). The concentration of orange dye in methylene chloride solution was 0.045 mg/ml. The amount of water added following the addition of the dye solution was 1.765 ml. The ratio of orange dye to polymer was 0.833 mg/g. The concentration of orange dye in methylene chloride solution was 0.045 mg/ml.

EXAMPLES 12-14

Cross-Linked Particles Containing Orange Fluorescent Dye

The procedure of Example 11 was followed to generate three additional particle sets, except that the respective amounts of water added were 5.3 ml, 10.6 ml and 21.2 ml.

EXAMPLE 15

Cross-Linked Particles Containing 1:1 Molar Ratio of Green and Orange Fluorescent Dyes (Green Dye/Polymer=0.150 mg/g; Orange Dye/Polymer 0.153 mg/g)

The procedure of Example 7 was followed, except that instead of one dye, an equimolar mixture of the green and the orange dyes of Examples 7-14 were used. Specifically, the methylene chloride solution with the two dyes had a concentration of 0.20 mg/ml of the green dye and 0.212 mg/ml of the orange dye.

EXAMPLES 16-17

Cross-Linked Particles Containing Differing Amounts of Green and Orange Fluorescent Dyes The procedure of Example 15 was followed to generate two additional particle sets, except that the respective amounts of water added were 5.3 ml and 21.2 ml.

EXAMPLE 18

Cross-Linked Particles Containing 1:0.5 Molar Ratio of Green and Orange Fluorescent Dyes (Green Dye/Polymer=0.150 mg/g; Orange Dye/Polymer=0.765 mg/g)

The procedure of Example 15 was followed, except that green and orange dyes were used in a molar ratio of 1:05. Specifically, the methylene chloride solution containing the two dyes had a concentration of 0.20 mg/ml of the green dye and 0.10 mg/ml of the orange dye.

EXAMPLES 19-21

Cross-Linked Particles Containing Green and Orange Fluorescent Dyes

The procedure of Example 18 was followed to generate three additional particle sets, except that the respective amounts of water added were 5.3 ml, 10.6 ml and 21.2 ml.

EXAMPLE 22

Cross-Linked Particles Containing 0.5:1 Molar Ratio of Fluorescent Green and Orange Dye (Green Dye/polymer=0.150 mg/g; Orange Dye/Polymer=0.765 mg/g)

The procedure of Example 15 was followed, except that (a) the green and orange dyes were used in a molar ratio of 0.5:1 and (b) the amount of water added was 1.5 ml. The methylene chloride solution containing the two dyes had a concentration of 0.10 mg/ml of the green dye and 0.212 mg/ml of the orange dye.

EXAMPLES 23-25

Cross-Linked Particles Containing Green and Orange Fluorescent Dyes

The procedure of Example 22 was followed to generate three additional particle sets, except that the respective amounts of water added were 5.3 ml, 10.6 ml and 21.2 ml.

The fluorescence intensities of the dyed particle sets prepared in accordance with Examples 7-25 are shown in Table 3.

TABLE 3

Green and Orange Intensities as a function of initial dye concentrations and added water amount

| Example # | Amt. of dye (mg/g polymer) | Water volume fraction | Orange Intensity (mean) | Green Intensity (mean) |
|---|---|---|---|---|
| 7 | 0.833 | 0.2626 | — | 980.184 |
| 8 | 0.833 | 0.5168 | — | 2638.53 |
| 9 | 0.833 | 0.6815 | — | 7251.29 |
| 10 | 0.833 | 0.8106 | — | 13175.8 |
| 11 | 0.333 | 0.2626 | 655.519 | — |
| 12 | 0.333 | 0.5168 | 1676.34 | — |
| 13 | 0.333 | 0.6815 | 6518.44 | — |
| 14 | 0.333 | 0.8106 | 12434.9 | — |
| 15 | 0.303 | 0.2626 | 1118.73 | 851.539 |
| 16 | 0.303 | 0.5168 | 2707.29 | 1989.1 |
| 17 | 0.303 | 0.8106 | 7296 | 5575.43 |
| 18 | 0.227 | 0.2626 | 196.022 | 326.917 |
| 19 | 0.227 | 0.5168 | 537.007 | 740.114 |
| 20 | 0.227 | 0.6815 | 1175.03 | 1686.59 |
| 21 | 0.227 | 0.8106 | 3140.37 | 5008.65 |
| 22 | 0.228 | 0.2324 | 261.14 | 176.635 |
| 23 | 0.228 | 0.5168 | 1087.38 | 439.545 |
| 24 | 0.228 | 0.6815 | 3469.4 | 1162.34 |
| 25 | 0.228 | 0.8106 | 8659.33 | 2974.67 |

EXAMPLE 26

Construction of a Fluorescence-Encoded Microparticle Library

A library containing the nineteen fluorescent microparticle sets according to Examples 7-25 was constructed. Ten of the nineteen sets were pooled and a fluorescence image of the mixture was recorded using a Nikon fluorescence microscope attached with a CCD camera and image acquisition software, permitting recording of the green and orange fluorescence. Ten clusters corresponding to the ten sets in the pool are apparent in the scatter plot (cluster map) of FIG. 7 employing logarithmic units of orange and green intensities on abscissa and ordinate, respectively. Results of the analysis of the clusters are summarized in Table 4.

TABLE 4

Cluster mean intensities and corresponding coefficients of variation

| Cluster # | Cluster details | | | |
|---|---|---|---|---|
| | Orange Intensity (mean) | CV(%) | Green Intensity (mean) | CV(%) |
| 11 | 211.363 | 10.27 | 541.50 | 8.65 |
| 12 | 584.10 | 6.74 | 1309.52 | 6.93 |
| 13 | 1300.47 | 5.66 | 3154.83 | 6.49 |
| 14 | 3369.32 | 4.75 | 9083.26 | 5.47 |
| 15 | 1228.41 | 5.81 | 1515.42 | 6.61 |
| 16 | 7699.52 | 4.53 | 9973.90 | 5.40 |
| 17 | 2868.52 | 5.28 | 3511.96 | 6.0 |
| 18 | 1242.01 | 5.95 | 825.846 | 6.93 |
| 19 | 4077.29 | 4.60 | 2386.0 | 5.54 |
| 20 | 9546.03 | 4.92 | 5627.64 | 5.79 |

EXAMPLE 27

Preparation of Encoded Magnetic Particles

A. Synthesis of Aqueous Ferrofluid

Stock solutions of 1M $FeCl_3$ in 1N HCl and 2M $FeCl_2$ in 1N HCl were prepared. In a 100 ml glass bottle, 4 ml of 1M $FeCl_3$ and 1 ml of 2M $FeCl_2$ solution were combined 400 ml of deionized distilled water and 100 ml of a 30 wt. % $NH_4OH$ solution were mixed to give 500 ml of an about 1.7 M solution of $NH_3$ in water. Fifty ml of the ammonia solution was added slowly to the glass bottle containing the iron salt solutions under vigorous agitation. Following completion of this step, 2 ml of a 25 wt. % solution of tetramethyl ammonium hydroxide was added and the solution sonicated for about 1 hr. Following this, the ferrofluid was allowed to settle overnight under the influence of a magnetic field. Next, the supernatant was decanted and the precipitate washed with distilled water. The iron oxide nanoparticle suspension in deionized water was homogenized and allowed to settle overnight under the influence of gravity. Following settling, the precipitate was discarded and the dark colored supernatant collected as the final ferrofluid suspension.

B. Synthesis of Encoded Magnetic Particles

Colored polymer microparticles of identical dye content and about 3 microns in diameter were prepared according to methods described herein to comprise a polystyrene core and a methyl methacrylate (MMA), hydroxyethylmethacrylate (HEMA) and methacrylic acid (MAA) shell. The particles were dispersed in de-ionized water to give 1 ml of an about 1% suspension. A 50 microliter aliquot of the ferrofluid suspension was then added to the suspension. The suspensions were admixed with end-over-end rotation for 48 hours at room temperature. The resultant solution was centrifuged at about 200 g for 10 minutes. A tan colored particle pellet was separated from the brownish red colored supernatant containing the excess nanopaticles. The supernatant was discarded and the pellet resuspended in 1% SDS solution and centrifuged again. This step was repeated two times and the pellet finally redispersed in PBS buffer with 0.5% Tween-20. The 1 ml particle suspension was taken in a standard 1.5 ml standard Eppendorf tube and the tube was mounted on a Promega Multitube Magnetic Stand. Complete separation of the suspended particles (as a pellet on the wall of the tube) took place in about 10 minutes.

EXAMPLE 28

Coupling of Avidin to Surface of Fluorescence-Encoded, Carboxyl-Functionalized Microparticles The carboxylate-functionalized polymer microparticles prepared according to Preparative Example 4 were rendered fluorescent according to the procedure of Example 1 to provide green fluorescent microparticles (dye/polymer=0.334 mg/g). In a 2 ml vial, an aliquot containing 10 mg of the green fluorescent microparticles was mixed with 1 ml 10 mM borate buffer (pH=8.5). The particles were then separated by centrifugation and the supernatant was siphoned off. Following this, the separated pellet was washed two times in 0.1M MES buffer (pH=4.5) and finally resuspended in 600 µl of the same. In a separate vial, 3 mg of Neutravidin (a biotin-binding protein, Pierce Chemicals, Rockford, Ill.) was dissolved in 300 µl of the MES buffer and the solution slowly added to the suspension of the polymer microparticles. The suspension was briefly sonicated using a probe sonicator. Following this, 150 µl of a 1-ethyl-3-(3-dimethylaminopropyl)-carbodiimide (Aldrich-Sigma, Milwaukee, Wis.) (EDAC) solution (200 mg/ml) was added to the particle solution. The mixture was allowed to react for 2 hours at room temperature, following which NeutrAvidin-functionalized polymer microparticles were separated, washed once in coupling buffer, twice in borate buffer and finally resuspended and stored in storage buffer (PBS pH=7.4, 0.1% (w/v) BSA, 0.5% (w/v) Tween 20, 10 mM ethylene diamine tetraacetic acid (EDTA) and 0.02% (w/v) $NaN_3$) at 2-8° C.

EXAMPLE 29

Coupling of Avidin to Surface of Fluorescence-Encoded, Tosyl-Functionalized Microparticles Commercially available cross-linked, tosyl-functionalized fluorescent core-shell microparticles (Bangs Laboratories, Inc., 3.2 µm, 10% solids, 12.5% divinylbenzene) were used in this example. The microparticles contained a green fluorescent dye loading of about 0.3 mg dye/g microparticle. Two hundred microliters of a suspension containing 1% of the microparticles were washed three times with 500 µl of 100 mM phosphate buffer (pH 7.4) and resuspended in 500 µl of that buffer. Following this, 20 µl of 5 mg/ml NeutrAvidin was added and the reaction allowed to proceed overnight at 37° C. Following completion of the incubation, the functionalized particles were washed once with 500 µl of PBS (pH 7.4) containing 10 mg/ml BSA, resuspended in 500 µl of that buffer and reacted for 1 hr at 37° C. to block unreacted sites on the microparticle surface. Following the blocking step, the microparticles were washed three times with 500 µl of PBS (pH 7.4) containing 10 mg/ml BSA and stored in 200 µl of PBS (pH 7.4) with 10 mg/ml BSA.

EXAMPLE 30

NeutrAvidin-Biotin Binding Assay Using Fluorescent Microparticles

One hundred microliters of the NeutrAvidin-functionalized fluorescent microparticles, containing 1% solids of Example 28, were placed in a 1.5 ml vial and the suspension diluted with 900 µl of PBS containing 0.01% (w/v) of Tween-20 (PBST). The microparticles were mixed by vortexing and then separated by centrifugation. The supernatant was aspirated off, and the pellet resuspended in 980 µl of PBS. 20 µl of a biotin-Oligo(dT)$_5$-CY5.5 (oligo labeled with a fluorescent dye Cy5.5)(IDT, Coralville, Iowa) at a concentration (26.7 ng/ml) was added and the mixture was incubated for 30 minutes at room temperature. Following this, the microparticles were separated and washed twice in PBST and resuspended in 1 ml of PBST. The microparticles were then assembled on a chip and their surface fluorescence was determined as a direct measure of the amount of biotin-Oligo (dT)$_5$-CY5.5 bound to the NeutrAvidin-functionalized particles. The results displayed in FIG. 8 show the biotinylated probe capture efficiency of two different particles (marked as samples) dyed using the method of the present invention and the capture efficiency of a non-dyed microparticle that was used as a positive control.

EXAMPLE 31

Hybridization Assay Using Fluorescent Microparticles

Biotinylated oligonucleotides with known base sequence were attached to the fluorescence-encoded microparticles functionalized with NeutrAvidin (as prepared in Example 30) as follows. Fifty microliters of a solution containing 1% of the NeutrAvidin-functionalized microparticles was placed in 0.1 ml reaction buffer (150 mM NaCl, 0.05 M EDTA, 0.5% bovine serum albumin, 0.5 mM Tris-HCl, and 100 mM sodium phosphate, pH 7.2) containing 0.4 µM biotinylated oligonucleotides and approximately $7 \times 10^5$ microparticles. The reaction mixture was incubated at room temperature for 30 minutes under vortexing. Upon completion of the reaction, the particles were collected by centrifugation, washed three times with PBST (150 mM NaCl, 100 mM sodium phosphate, pH 7.2 with 0.05% Tween 20) and resuspended in 0.2 ml PBS (150 mM NaCl, 100 mM sodium phosphate, pH 7.2.). The foregoing procedure can be utilized to couple any biotinylated oligonucleotide of interest to NeutrAvidin-functionalized particles.

One microliter of a 10 µM solution of a synthetic target (5'-/CY5.5/SEQ ID NO:1/-3') in de-ionized water was diluted with 19 µl of 1× TMAC (4.5 M tetramethyl ammonium chloride, 75 mM Tris pH 8.0, 3 mM EDTA, 0.15% SDS) to a final volume of 20 µl. Two types of oligonucleotide-functionalized fluorescent microparticles were assembled into planar arrays on silicon substrates. The first microparticle type was functionalized with a matched probe sequence 5'-Biotin/(TEG-spacer)/SEQ ID NO:2/-3' The second microparticle type was functionalized with a mismatched probe sequence Biotin/ (TEGspacer)/SEQ ID NO:3/-3'). Twenty microliters of the synthetic target was added to the substrate surface and the substrate was placed in a 53° C. heater for 15 minutes under shaking at 30 rpm. The slide was then removed from the heater the target solution was aspirated. The substrate was washed once with 1× TMAC at room temperature. Following this, 10 µl of 1× TMAC was placed on the substrate surface, covered with a glass cover-slip and the fluorescence intensity of the array recorded using the instrumentation described before. The results in FIG. 9 show that the hybridization was specific.

EXAMPLE 32

Immunoassay Using Fluorescent Microparticles

Commercially available cross-linked, tosyl-functionalized fluorescent core-shell microparticles (Bangs Laboratories, Inc., 3.2 µm, 10% solids, 12.5% divinylbenzene) were used in this example. The microparticles contained a green fluorescent dye loading of about 0.3 mg dye/g microparticle. One ml of PBST (PBS pH 7.4 containing 0.1% Tween-20) and 50 µL of a 1% suspension of the dyed tosylate-functionalized microparticles (0.5 mg) were combined in an eppendorf tube and mixed well by vortexing. Following this, the suspension was centrifuged at 7500 rpm for 2 min. and the supernatant decanted. The operation was repeated once with 1 mL of PBST and once with 1 mL of PBS. Microparticles were finally resuspended in 1 mL of PBS. A pre-calculated amount of anti-TNF-α antibody (R&D Systems), at a concentration of 50 µg protein/mg microparticles, was added, and the suspension was incubated overnight at room temperature under end-over-end rotation. The microparticles were then washed and resuspended in 1 ml of blocking/storage buffer (0.1M PBS pH 7.4 containing 0.1% BSA, 0.1% Tween 20 and 0.1% NaN$_3$). Ten microliters of the antibody-functionalized microparticle suspension were placed in a 1.5 mL Eppendorf tube. The particles were washed twice with 1 mL of PBST and once with 1 mL of PBS (pH7.2). Thirty microliters of a stock solution of Cy5.5-labeled goat anti-mouse IgG was diluted by adding 1470 µL of PBS (1:50). Five hundred microliters of this solution was transferred to the microparticle suspension and the antibody-binding reaction incubated for 60 min. at room temperature under end-over-end mixing. Following incubation, the particles were washed twice with 1 mL of PBST and then resuspended in 10 µL of PBS. A planar array of microparticles was then assembled on silicon substrate for analysis as in Example 31. An average Cy5.5 intensity of 6,500 was recorded using the conditions and instrumentation described before.

All references discussed herein are incorporated by reference. One skilled in the art will readily appreciate that the present invention is well adapted to carry out the objects and obtain the ends and advantages mentioned, as well as those inherent therein. The present invention may be embodied in other specific forms without departing from the spirit or essential attributes thereof and, accordingly, reference should be made to the appended claims, rather than to the foregoing specification, as indicating the scope of the invention.

---

What is claimed is:

1. An automated method for producing dyed polymer microparticles comprising:
   (a) providing a microparticle master-batch suspension comprising microparticles characterized by a first dye concentration in the microparticles, said microparticles suspended in a dye solution comprising at least one dye and a solvent system comprising:
      (i) at least one first solvent in which the dye and the microparticle polymer are soluble;
      (ii) at least one second solvent in which the dye and the polymer are not or only weakly soluble, said first and second solvents being immiscible or at most partially miscible;
      (iii) at least one third solvent in which the dye and the polymer are not or only weakly soluble, said third solvent being miscible with the first and second solvents;
   (b) creating two or more microparticle suspension aliquots from said master-batch suspension, each such suspension aliquot characterized by microparticles of said first dye concentration suspended in said dye solution;
   (c) executing, at least once for each created aliquot, the following sequence of steps to transform the microparticle dye state in each aliquot from said first dye concentration to a selected second dye concentration in the microparticles:
      (i) computing, for the selected second dye concentration:
         (1) the amount of dye dissolved in said first solvent, and
         (2) the amount of second solvent, required to be added to said aliquot to attain said selected second microparticle dye concentration; and
      (ii) dispensing to said aliquot the amount of dye dissolved in said first solvent and the amount of second solvent required to attain said selected second microparticle dye concentration.

2. The method according to claim 1 wherein the step of creating said two or more microparticle suspension aliquots containing selected added amounts of second solvent comprises dividing the microparticle suspension master-batch into two or more aliquots, and adding selected amounts of second solvent to said aliquots.

3. The method according to claim 1 wherein the step of creating said two or more microparticle suspension aliquots containing selected added amounts of second solvent comprises continuously or semi-continuously adding second solvent to the microparticle suspension master-batch and removing at least one portion of said master-batch at a time interval during the course of said second solvent addition to form two or more microparticle suspension aliquots containing selected added amounts of second solvent.

4. The method according to claim 1 wherein the dye is a fluorescent dye.

5. The method according to claim 4 wherein the dye is a hydrophobic dye.

6. The method according to claim 4 wherein the dye is selected from the group consisting of styryl dyes, pyrromethane dyes, coumarin dyes, and combinations thereof.

7. The method according to claim 5 wherein the microparticles comprise a hydrophobic polymer.

8. The method according to claim 7 wherein the polymer is a homopolymer or copolymer comprising a vinyl-containing monomer.

9. The method according to claim 7 wherein the polymer is selected from the group consisting of homopolymers or copolymers of polystyrene, poly(methyl methacrylate), polyacrylamide, poly(ethylene glycol), poly(hydroxyethylmethacrylate), poly(vinyltoluene), poly(divinylbenzene), and combinations thereof.

10. The method according to claim 9 wherein the polymer is polystyrene or copolymer thereof containing at least 50% by weight styrene monomer units.

11. The method according to claim 10 wherein the polymer is a styrene/methacrylic acid copolymer.

12. The method according to claim 8 wherein the polymer is cross-linked.

13. The method according to claim 7 wherein the microparticles have a diameter of from about 0.1 to about 100 microns.

14. The method according to claim 13 wherein the particles are monodisperse.

15. The method according to claim 7 comprising a solvent wherein the first solvent is selected from the group consisting of methylene chloride, chloroform, tetrahydrofuran, dioxane, cyclohexane, benzene, toluene, butylacetate, lower chlorinated aliphatic hydrocarbons, and combinations thereof; the second solvent is water; and the third solvent is selected from the group consisting of acetone, lower alcohols, and combinations thereof.

16. The method according to claim 15 wherein the first solvent is methylene chloride or dichloromethane, and the second solvent is an alcohol.

17. The method according to claim 16 wherein the third solvent is alcohol.

18. The method according to claim 1 wherein the microparticle is a core-shell microparticles comprising a central core comprising one or more core polymers surrounded by a shell comprising one or more shell polymers.

19. The method according to claim 18 wherein the core polymer comprises a copolymers of styrene and a monomer more hydrophilic than styrene.

20. The method according to claim 18 wherein the core polymer comprises methacrylic acid.

21. The method according to claim 1 wherein at least a portion of the microparticles are magnetically responsive.

* * * * *